US012566891B2

(12) United States Patent
Branscomb et al.

(10) Patent No.: US 12,566,891 B2
(45) Date of Patent: Mar. 3, 2026

(54) HIGHER-LAYER-PROCESSING DATA IN TIME-SENSITIVE DATA BLOCKS AT A PHYSICAL-LAYER-INTERFACE DEVICE

(71) Applicant: Microchip Technology Incorporated, Chandler, AZ (US)

(72) Inventors: Brian Branscomb, Hopkinton, MA (US); William Mahany, West Islip, NY (US); Sailesh Rupani, Telengana (IN)

(73) Assignee: Microchip Technology Incorporated, Chandler, AZ (US)

( * ) Notice: Subject to any disclaimer, the term of this patent is extended or adjusted under 35 U.S.C. 154(b) by 132 days.

(21) Appl. No.: 17/457,298

(22) Filed: Dec. 2, 2021

(65) Prior Publication Data

US 2022/0179997 A1 Jun. 9, 2022

Related U.S. Application Data

(60) Provisional application No. 63/199,058, filed on Dec. 4, 2020.

(51) Int. Cl.
*G06F 21/64* (2013.01)

(52) U.S. Cl.
CPC .................................... *G06F 21/64* (2013.01)

(58) Field of Classification Search
CPC ... G06F 21/64; H04L 47/2416; H04L 47/431; H04L 63/162; H04L 67/61; H04L 67/62; H04L 69/22; H04L 63/123
See application file for complete search history.

(56) References Cited

U.S. PATENT DOCUMENTS

| | | | | |
|---|---|---|---|---|
| 7,457,897 B1 * | 11/2008 | Lee | ...................... | G06F 13/1684 |
| | | | | 710/72 |
| 9,413,783 B1 * | 8/2016 | Keogh | ................ | H04L 63/1458 |

(Continued)

FOREIGN PATENT DOCUMENTS

| | | |
|---|---|---|
| CN | 101926146 A | 12/2010 |
| CN | 109691038 A | 4/2019 |
| TW | 201132075 A | 9/2011 |

OTHER PUBLICATIONS

Finn, "Introduction to Time-Sensitive Networking", IEEE Communications Standards Magazine, IEEE, vol. 2, No. 2, (Jun. 1, 2018) pp. 22-28.

(Continued)

*Primary Examiner* — Lynn D Feild
*Assistant Examiner* — Vladimir I Gavrilenko
(74) *Attorney, Agent, or Firm* — TraskBritt

(57) ABSTRACT

Examples of the present disclosure relate generally to implementing higher-layer processing on time-sensitive data blocks at a physical-layer-interface device. Some examples include logic to perform operations, the operations including providing data blocks to a physical-layer-interface device. The operations may also include adding dummy data into one or more time-sensitive data blocks of the data blocks being provided to the physical-layer-interface device. A size of the dummy data corresponding to a size of higher-layer-processing data. Other example operations may include removing higher-layer-processing data from a first ingressing data block. The other operations may also include removing a portion of the first ingressing data block and adding the portion to a subsequent ingressing data block. A size of the portion corresponding to the size of integrity-detection data. The other operations may also include removing the integrity-detection data from an ingressing (Continued)

data block. Related methods, systems, and devices are also disclosed.

23 Claims, 13 Drawing Sheets

(56) References Cited

U.S. PATENT DOCUMENTS

| | | | |
|---|---|---|---|
| 9,774,578 B1* | 9/2017 | Ateniese | G06F 3/0673 |
| 11,537,733 B2* | 12/2022 | Zhang | H04L 63/105 |
| 2011/0035580 A1 | 2/2011 | Wang et al. | |
| 2018/0203641 A1 | 7/2018 | Petrocelli | |
| 2020/0336941 A1 | 10/2020 | Yi et al. | |
| 2021/0075890 A1* | 3/2021 | Raman | H04L 41/084 |
| 2021/0288946 A1* | 9/2021 | Borzov | H04L 9/3247 |
| 2022/0321493 A1* | 10/2022 | Rollet | H04L 47/24 |

OTHER PUBLICATIONS

International Search Report from International Application No. PCT/US2021/072691, mailed Feb. 25, 2022, 5 pages.

International Written Opinion from International Application No. PCT/US2021/072691, mailed Feb. 25, 2022, 7 pages.

Mcintosh et al., "MACsec-aware TSN Traffic Shapers; ae-mcintosh-macsec-aware-tsn-shapers", IEEE Draft; ae-mcintosh-macsec-aware-tsn-shapers, IEEE-SA Piscataway, NJ USA, vol. 802, (Apr. 28, 2015) pp. 1-12.

McIntosh, James A., MACsec-aware TSN Traffic Shapers, VITESSE Semiconductor Corporation, Apr. 27, 2015, 12 pages.

Office Action and Search Report of Taiwan Patent Application No. 110145190, issued Sep. 23, 2025, 10 pages with English translation.

The First Office Action and Search Report of Chinese Patent Application No. 202180088048.0, issued Nov. 6, 2025, 17 pages with English translation.

* cited by examiner

*900*

Provide Data Blocks To A Physical-Layer-Interface Device   *902*

Add Dummy Data Into One Or More Time-Sensitive Data Blocks Of The Data Blocks Being Provided To The Physical-Layer-Interface Device, A Size Of The Dummy Data Corresponding To A Size Of Higher-Layer-Processing Data   *904*

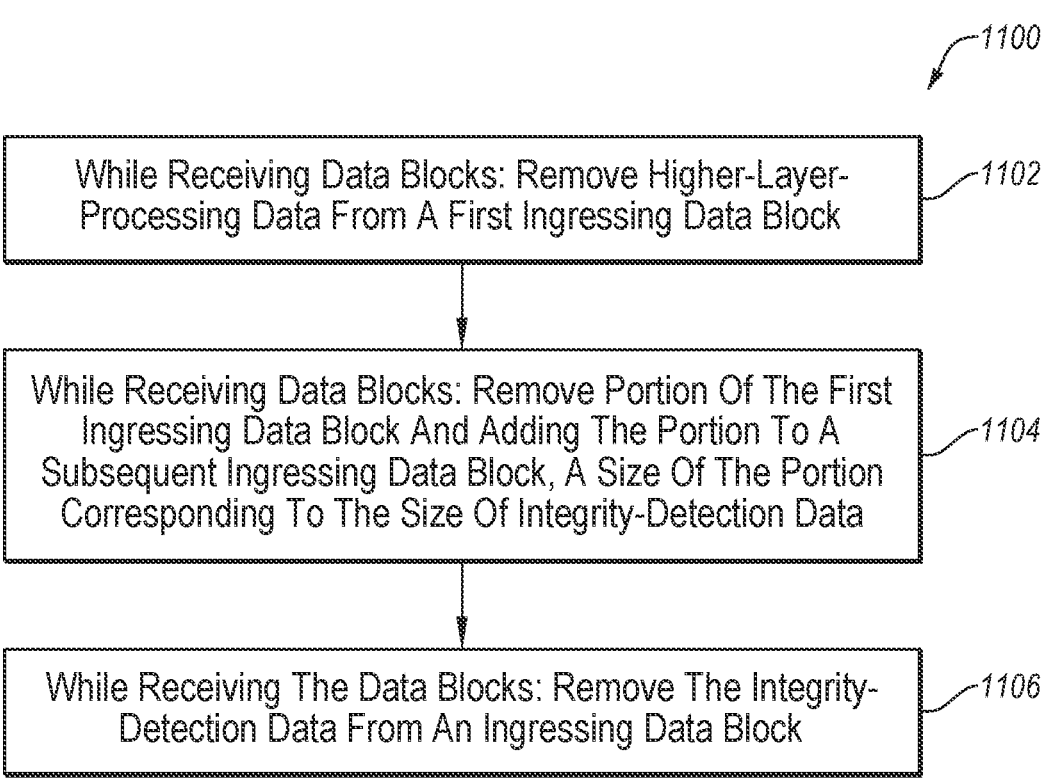

*1100*

While Receiving Data Blocks: Remove Higher-Layer-Processing Data From A First Ingressing Data Block — *1102*

While Receiving Data Blocks: Remove Portion Of The First Ingressing Data Block And Adding The Portion To A Subsequent Ingressing Data Block, A Size Of The Portion Corresponding To The Size Of Integrity-Detection Data — *1104*

While Receiving The Data Blocks: Remove The Integrity-Detection Data From An Ingressing Data Block — *1106*

*FIG. 11*

HIGHER-LAYER-PROCESSING DATA IN TIME-SENSITIVE DATA BLOCKS AT A PHYSICAL-LAYER-INTERFACE DEVICE

CROSS-REFERENCE TO RELATED APPLICATION

This application claims the benefit of the priority date of U.S. Provisional Patent Application No. 63/199,058, filed Dec. 4, 2020, and titled "IMPLEMENTING HIGHER-LAYER PROCESSING ON TIME-SENSITIVE DATA BLOCKS AT A PHYSICAL-LAYER INTERFACE," the disclosure of which is incorporated herein in its entirety by this reference.

FIELD

This description relates, generally, to higher-layer-processing data in time-sensitive data blocks at a physical-layer-interface device (PHY). More specifically, some examples relate to implementing processing that adds or removes data to time-sensitive data blocks at the PHY. More specifically yet, some examples relate to implementing processing, e.g., such that when data is added to time-sensitive data blocks at the PHY, the additions do not disrupt the timing of the time-sensitive data blocks, without limitation. Further, some examples relate to implementing processing such that when data is removed from data blocks at the PHY, the removal does not leave the blocks too short and/or the host is not required to alter data outside a header, without limitation.

BACKGROUND

Media Access Control (MAC) security (MACsec) may be used to increase security of communication in an Ethernet network. MACsec may involve encrypting Ethernet frames, adding a security tag (SecTag) to the Ethernet frames, and adding integrity-detection data (ICV) to the Ethernet frames. MACsec is described in at least the following standards: Institute of Electrical and Electronics Engineers (IEEE) Standard (Std) 802.1Q-2018, IEEE Std 802.1AB-2016, IEEE Std 802.AS-2020, IEEE Std 802.AX-2020, IEEE Std 802.1BA-2011, IEEE Std 802.1CB-2017, IEEE Std 802.1CM-2018, IEEE Std 802.1CMde-2020, IEEE Std 802.1Qbu-2016, IEEE Std 802.1Qbv-2015, IEEE Std 802.1Qca-2015, IEEE Std 802.1Qch-2017, IEEE Std 802.1.Qci-2017, IEEE Std 802.1Qcc-2018, IEEE Std 802.1Qcp-2018, IEEE Std 802.1Qcr-2020, IEEE Std 802.1Qcx-2020, IEEE Std 802.1AS-2011, IEEE Std 802.1Qat-2010, IEEE Std 802.1Qav2009, IEEE Std 802.1BA-2011, IEEE Std 802.3br-2016, and IEEE Std 802.3-2018.

Time-Sensitive Networking (TSN) may include quality-of-service techniques that may include providing for time-sensitive communication. TSN may involve scheduling Ethernet frames at a sender such that a receiver may determine timing information based on the receipt of the scheduled Ethernet frames. Further, in some examples, TSN may involve interrupting a frame to send a higher-priority frame. TSN is described in at least IEEE Std 802.1AE.

BRIEF DESCRIPTION OF THE DRAWINGS

While this disclosure concludes with claims particularly pointing out and distinctly claiming specific examples, various features and advantages of examples within the scope of this disclosure may be more readily ascertained from the following description when read in conjunction with the accompanying drawings, in which:

FIG. 11 is a flowchart of yet another example method according to one or more examples.

DETAILED DESCRIPTION

Figure 1:
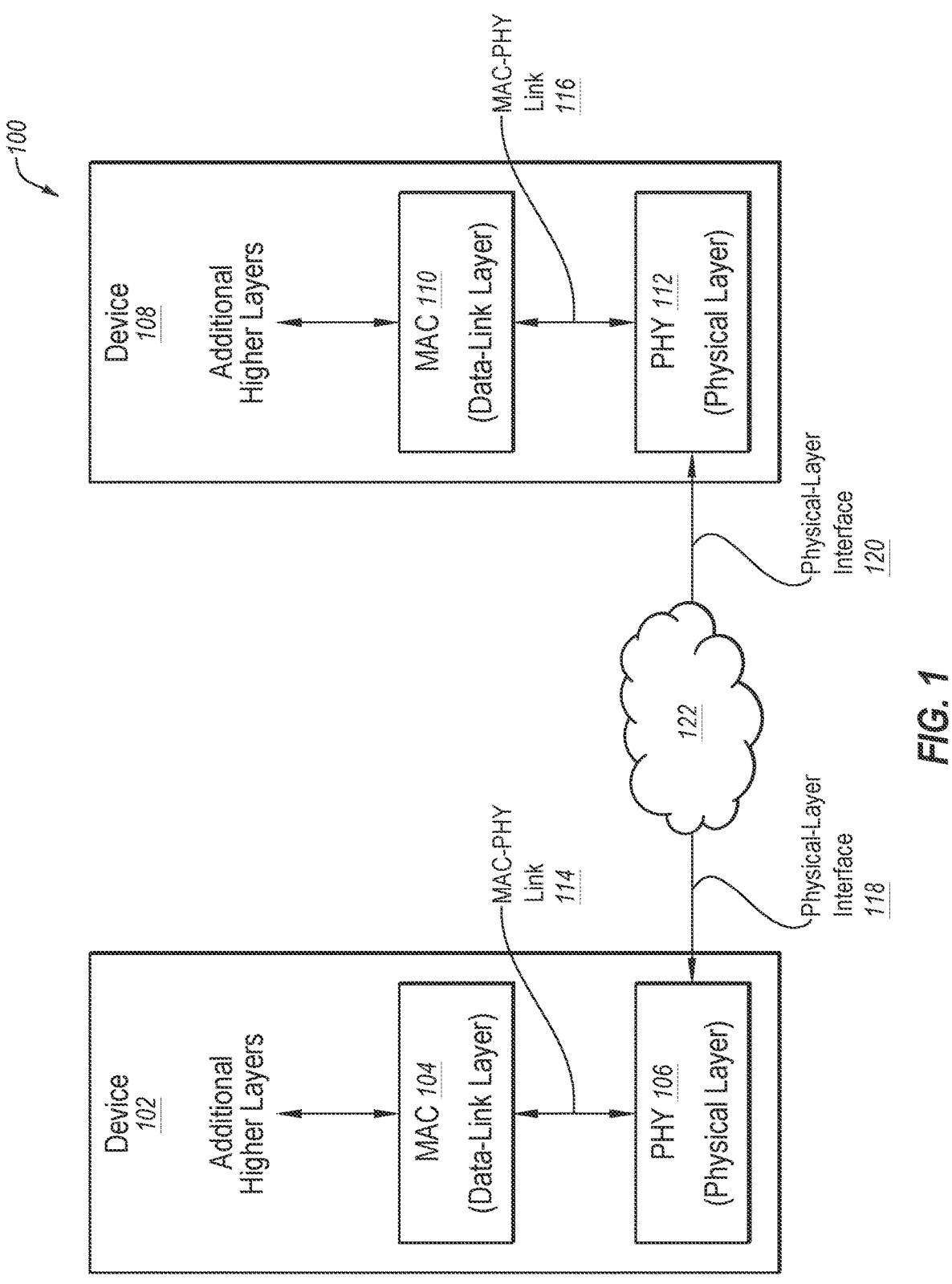
FIG. 1 illustrates an example environment in which one or more examples may operate.

In the following detailed description, reference is made to the accompanying drawings, which form a part hereof, and in which are shown, by way of illustration, specific examples in which the present disclosure may be practiced. These examples are described in sufficient detail to enable a person of ordinary skill in the art to practice the present disclosure. However, other examples may be utilized, and structural, material, and process changes may be made without departing from the scope of the disclosure.

The illustrations presented herein are not meant to be actual views of any particular method, system, device, or structure, but are merely idealized representations that are employed to describe the examples of the present disclosure. The drawings presented herein are not necessarily drawn to scale. Similar structures or components in the various drawings may retain the same or similar numbering for the convenience of the reader; however, the similarity in numbering does not mean that the structures or components are necessarily identical in size, composition, configuration, or any other property.

The following description may include examples to help enable one of ordinary skill in the art to practice the disclosed examples. The use of the terms "exemplary," "by example," and "for example," means that the related description is explanatory, and though the scope of the disclosure is intended to encompass the examples and legal equivalents, the use of such terms is not intended to limit the scope of an example of this disclosure to the specified components, steps, features, functions, or the like.

It will be readily understood that the components of the examples as generally described herein and illustrated in the drawing could be arranged and designed in a wide variety of different configurations. Thus, the following description of various examples is not intended to limit the scope of the present disclosure, but is merely representative of various examples. While the various aspects of the examples may be presented in drawings, the drawings are not necessarily drawn to scale unless specifically indicated.

Furthermore, specific implementations shown and described are only examples and should not be construed as the only way to implement the present disclosure unless specified otherwise herein. Elements, circuits, and functions may be depicted by block diagram form in order not to obscure the present disclosure in unnecessary detail. Conversely, specific implementations shown and described are exemplary only and should not be construed as the only way to implement the present disclosure unless specified otherwise herein. Additionally, block definitions and partitioning of logic between various blocks is exemplary of a specific implementation. It will be readily apparent to one of ordinary skill in the art that the present disclosure may be practiced by numerous other partitioning solutions. For the most part, details concerning timing considerations and the like have been omitted where such details are not necessary to obtain a complete understanding of the present disclosure and are within the abilities of persons of ordinary skill in the relevant art.

Those of ordinary skill in the art would understand that information and signals may be represented using any of a variety of different technologies and techniques. For example, data, instructions, commands, information, signals, bits, and symbols that may be referenced throughout this description may be represented by voltages, currents, electromagnetic waves, magnetic fields or particles, optical fields or particles, or any combination thereof. Some drawings may illustrate signals as a single signal for clarity of presentation and description. It will be understood by a person of ordinary skill in the art that the signal may represent a bus of signals, wherein the bus may have a variety of bit widths and the present disclosure may be implemented on any number of data signals including a single data signal. A person having ordinary skill in the art would appreciate that this disclosure encompasses communication of quantum information and qubits used to represent quantum information.

The various illustrative logical blocks, modules, and circuits described in connection with the examples disclosed herein may be implemented or performed with or by logic and/or circuits including, as non-limiting examples: a general purpose processor, a special purpose processor, a Digital Signal Processor (DSP), an Integrated Circuit (IC), an Application Specific Integrated Circuit (ASIC), a Field Programmable Gate Array (FPGA) or other programmable logic device, discrete gate or transistor logic, discrete hardware components, or any combination thereof designed to perform the functions described herein. A general-purpose processor (may also be referred to herein as a host processor or simply a host) may be a microprocessor, but in the alternative, the processor may be any conventional processor, controller, microcontroller, or state machine. A processor may also be implemented as a combination of computing devices, such as a combination of a DSP and a microprocessor, a plurality of microprocessors, one or more microprocessors in conjunction with a DSP core, or any other such configuration. A general-purpose computer including a processor is considered a special-purpose computer while the general-purpose computer executes computing instructions (e.g., software code) related to examples of the present disclosure.

The examples may be described in terms of a process that is depicted as a flowchart, a flow diagram, a structure diagram, or a block diagram. Although a flowchart may describe operational acts as a sequential process, many of these acts can be performed in another sequence, in parallel, or substantially concurrently. In addition, the order of the acts may be re-arranged. A process may correspond to a method, a thread, a function, a procedure, a subroutine, or a subprogram, without limitation. Furthermore, the methods disclosed herein may be implemented in hardware, software, or both. If implemented in software, the functions may be stored or transmitted as one or more instructions or code on computer-readable media. Computer-readable media includes both computer storage media and communication media including any medium that facilitates transfer of a computer program from one place to another.

Some devices may communicate with other devices across a communication network (e.g., an Ethernet network), or across a direct connection. Such devices may implement various networking protocols at various components or devices. For example, a device may include a component or device that implements protocols associated with Open System Interconnection (OSI) layer 2, the data-link layer, e.g., a component or device that implements Media Access Control (MAC) protocols. In the present disclosure, a component or device that implements MAC protocols may be referred to as a "MAC." Additionally, the device may include a component that implements protocols associated with OSI layer 1, e.g., a component that implements protocols at a physical-layer interface. In the present disclosure, a component or device that implements protocols at a physical-layer interface may be referred to as a "PHY" or a "physical-layer-interface device." In the present disclosure, the term "physical-layer interface" may refer to the interface between a PHY and an Ethernet link. A PHY may also have an interface to a MAC, such a link may be referred to herein as a "MAC-PHY link."

In some cases, it may be advantageous to implement higher-layer processing at a component or device typically associated with lower-layer processing. For example, it may be advantageous to implement security protocols of a higher layer (e.g., layer 2) at a PHY. In the present disclosure, processing associated with a layer (e.g., an OSI layer) that is implemented at a component or device that is typically associated with a lower layer may be referred to as "higher-layer processing." As a specific, non-limiting example, MACsec, internet protocol security (IPsec), a cryptographic process, and encapsulation may be higher-layer processing relative to a PHY.

Implementing higher-layer processing at a component or device typically associated with lower-layer processing may allow for advantages with regard to scaling. In particular, conventionally, processing implemented in a system on a chip (SoC)/switch/application-specific integrated circuit (ASIC) may be scaled to meet the largest-expected performance. For example, a SoC/switch/ASIC may be sized to service a largest-expected performance even if, initially, a lower-scale performance is used, or if the largest-expected performance is never used. By contrast, processing implemented in a PHY can be scaled according to a "pay as you grow" model. As more ports are enabled, each requiring a PHY to be added, it can be determined whether each new port requires higher-layer processing and then the higher-layer processing capability can be added to ports on an as-needed basis by supplying the proper PHY.

Additionally or alternatively, implementing higher-layer processing at a component or device typically associated with lower-layer processing may allow for advantages with regard to feature upgrades. Typically, the SoC/switch/ASIC is a large and complicated part of a system, and not upgraded nearly as easily or as often as a PHY. So, implementing higher-layer processing at a PHY, may allow a system that initially does not support a feature (e.g., MACsec), to later have the feature added by upgrading the PHY. Upgrading a PHY to add a MACsec feature to a system is an easier way to add the MACsec feature than replacing the much larger SoC/switch/ASIC.

However, in some cases, complications may arise from implementing higher-layer processing at a component or device typically associated with lower-layer processing. For example, implementing protocols at different layers may change the order in which the protocols are implemented. For example, with regard to transmitting data blocks, a protocol that involves adding data to data blocks implemented after (e.g., at a PHY) a time-sensitive protocol (e.g., implemented at a MAC) may disrupt the timing of the data blocks and disrupt the performance of the time-sensitive protocol. As another example, with regard to receiving data blocks, a protocol that involves removing data from data blocks (e.g., MACsec) implemented at a PHY, may render data blocks too short, e.g., too short to for protocols at receiving host.

One or more examples may allow a component or device typically associated with lower-layer processing to perform one or more operations of higher-layer processing without disrupting operations of a time-sensitive protocol. As a specific, non-limiting example, one or more examples may allow a PHY to implement processing that adds data to egressing data blocks without disrupting time-sensitive operations that may occur at a MAC. As a specific, non-limiting example, a PHY may implement a MAC security (MACsec) protocol without disrupting operations of a time-sensitive networking (TSN) protocol occurring at a MAC. In particular, one or both of the MAC and the PHY may implement one or more examples such that the MAC may implement TSN and the PHY may implement MACsec without disrupting the operations of TSN at the MAC. As another specific, non-limiting example, one or more examples may allow a PHY to implement processing that removes data from incoming data blocks without rendering the data blocks too short. In particular, a PHY may implement MACsec and may alter received data blocks such that after the removal of a SecTag and/or ICV, the data frames are not too short. Further, the data blocks may be altered in such a way that the host is not required to alter bytes outside the header of the data blocks.

FIG. 1 illustrates an example environment 100 in which one or more examples may operate. In particular, FIG. 1 illustrates device 102 and device 108 that may communicate with each other (e.g., directly or across a communication network 122). Device 102 includes circuits and/or logic including MAC 104 and PHY 106 and device 108 includes circuits and/or logic including MAC 110 and PHY 112.

MAC 104 and MAC 110 may perform one or more operations associated with the data-link layer (e.g., OSI layer 2). For example, MAC 104 and MAC 110 may match, add, and remove MAC headers from incoming frames. MAC 104 may provide frames to and receive frames from PHY 106 and MAC 110 may provide frames to and receive frames from PHY 112.

PHY 106 and PHY 112 may perform one or more operations associated with the physical layer (e.g., OSI layer 1). For example, PHY 106 and PHY 112 may transmit and receive data across a link (e.g., directly or across the communication network 122) by transmitting and receiving signals at a transmission medium. Device 102 includes a MAC-PHY link 114 and a physical-layer interface 118. Device 108 includes MAC-PHY link 116 and a physical-layer interface 120.

As an example, a message from device 102 to device 108 may originate at device 102. The message may be altered by operations associated with one or more of OSI layers 7 through 2, including, for example, the message may be reformatted as one or more data blocks (e.g., one or more Ethernet frames). The one or more data blocks may then be altered by operations at MAC 104, e.g., a MAC header may be added to the one or more data blocks. The one or more data blocks may then be provided to PHY 106 by MAC 104. The one or more data blocks may then be transmitted at a physical medium by PHY 106. The one or more data blocks may traverse communication network 122 as illustrated in FIG. 1, or in cases in which PHY 106 is directly connected to PHY 112, the one or more data blocks may be transmitted directly from PHY 106 to PHY 112. In either case, the one or more data blocks will be received at the physical medium by PHY 112. The one or more data blocks may then be provided to MAC 110 by PHY 112. At MAC 110 the MAC header may be matched and removed. Then the one or more data blocks may be altered by operations associated with one or more of OSI layers 2 through 7, resulting in reception of the message by device 108.

Figure 2:
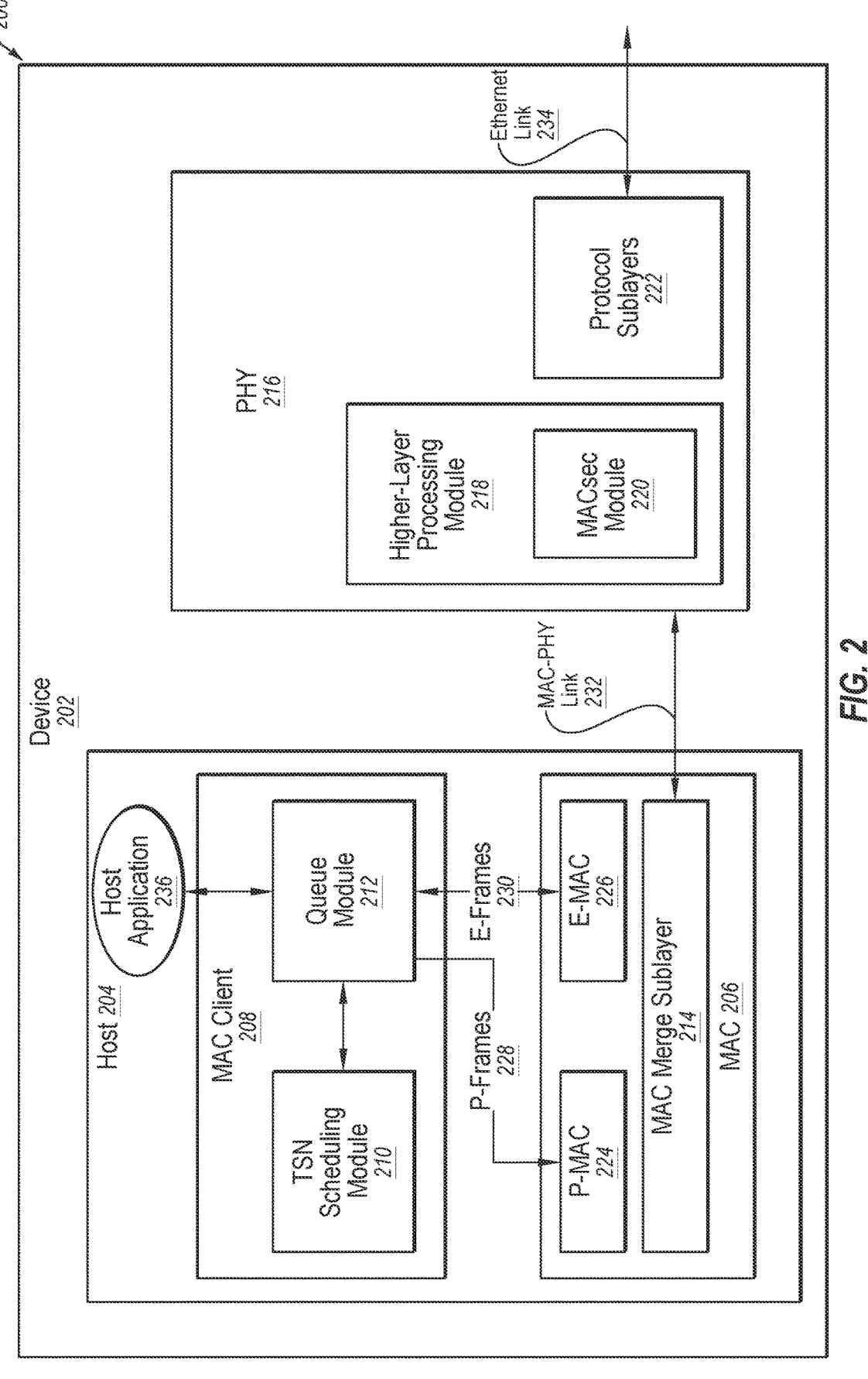
FIG. 2 illustrates an example system that may implement one or more examples.

FIG. 2 illustrates an example system 200 that may implement one or more examples. In particular, system 200 includes device 202 that includes logic and/or circuits including PHY 216 and host 204. Host 204 includes logic and/or circuits including MAC client 208 and MAC 206. Device 202, including MAC 206, MAC client 208, and PHY 216, may implement one or more examples. For example, one or more of host 204, MAC 206, MAC client 208, and PHY 216 may implement one or more examples such that PHY 216 may implement one or more operations associated with higher-layer processing without disrupting time-sensitive operations. As a specific, non-limiting example, one or more of host 204, MAC 206 and MAC client 208 may provide data blocks to PHY 216 in such a way that when PHY 216 implements the higher-layer processing (e.g., operations associated with OSI layer 2 or higher, e.g., MACsec), the implementation of the higher-layer processing does not disrupt the time-sensitive operations (e.g., associated with TSN) e.g., implemented previously at host 204. As another example, one or more of host 204, MAC 206, MAC client 208, and PHY 216 may implement one or more examples such that PHY 216 may implement one or more operations associated with higher-layer processing without rendering received data blocks too short. As a specific non-limiting example, PHY 216 may receive altered data blocks (e.g., altered according to MACsec) at Ethernet link 234 and provide processed data blocks (e.g., processed to remove the alterations) to MAC 206 in such a way that the processing does not render the blocks too short.

Device 202 may be, or may include, any device that communicates on a communication network. For example, device 202 may be an example of device 102 or device 108 of FIG. 1 or a component or device thereof.

Host 204 may be, or may include, hardware (including, e.g., circuits and/or logic) to perform operations associated with host application 236. Host application 236 may use features of MAC 206, MAC client 208, and PHY 216 to communicate across Ethernet link 234. Further, host application 236 may use features such as, for example, TSN and MACsec, without limitation. For example, if host application 236 is an industrial control application, host 204 may implement control software that may move actuators and valves to perform industrial operations. The industrial operations may need to be performed at specified times, hence the need for TSN to ensure the commands are received at exactly the right time. Further, the industrial environment may be such that security is a concern (e.g., in a nuclear power plant, without limitation), so host 204 may require MACsec to protect commands being sent. In some examples, host 204 may be a data forwarding device, e.g., an Ethernet switch or a router, without limitation. In such cases, there may be no host application 236, but host 204 may connect from one physical-layer interface (not labeled in FIG. 2) to a physical-layer interface of another device (not illustrated in FIG. 2) (e.g., across Ethernet link 234) using any suitable protocol, e.g., Ethernet switching or IP routing, without limitation.

MAC 206 and/or MAC client 208 may implement one or more operations associated with OSI layer 2. For example, MAC 206 and/or MAC client 208 may match, add, and/or remove MAC headers. Further, MAC 206 and/or MAC client 208 may support frame preemption. For example, with regard to transmitting data (e.g., from device 202 to another device), MAC 206 and/or MAC client 208 may allow later-received express frames 230 ("e-frames 230") (e.g., received at E-MAC 226) to be transmitted before earlier-received pre-emptible frames 228 ("p-frames 228") (e.g., received at P-MAC 224) based on the e-frames status as "express." The preemption may be according to IEEE 802.3 clause 99. The p-frames 228 and e-frames 230 may be merged at MAC merge sublayer 214 before being provided to PHY 216 at MAC-PHY link 232.

In some examples, MAC client 208 may implement a timing-sensitive protocol. For example, MAC client 208 may implement a timing-sensitive protocol (e.g., TSN). MAC client 208 may include TSN scheduling module 210 and queue module 212, which collectively may perform one or more operations related to TSN.

TSN scheduling module 210 may schedule data blocks (e.g., Ethernet Frames). TSN scheduling module 210 may cause the scheduled data blocks to be transmitted according to a schedule, i.e., such that a receiver may expect the scheduled data blocks according to the schedule. For example, scheduled data blocks may be transmitted at regular intervals. Additionally, TSN scheduling module 210 may determine whether received data blocks are received according to a reception schedule.

Queue module 212 may hold one or more data blocks in a queue. The data blocks may be held in the queue before being transmitted to allow for higher-priority data blocks (e.g., e-frames 230) to preempt lower-priority data blocks (e.g., p-frames 228). Thus, higher priority e-frames 230 may be sent regardless of any low priority p-frames 228 that may already be in the process of being sent. Frame Preemption may allow e-frames 230 to interrupt p-frames 228 to keep to the schedule.

Further, MAC client 208 and/or MAC 206 may allow lower-priority data blocks to be fragmented (e.g., divided into fragments) to allow higher-priority data blocks to interrupt transmission of the lower-priority data blocks.

Additionally, MAC 206 and MAC client 208 may receive and/or process data frames received from PHY 216 and provide the data frames to host 204 and/or to host application 236. MAC 206 and MAC client 208 may handle data frames according to TSN. For example, MAC 206 may validate frame fragments (or frames) and/or reassemble validated frame fragments. Further, MAC client 208 may provide e-frames 230 as soon as they are received. Additionally or alternatively, MAC client 208 may hold received p-frames 228 at queue module 212 so that host application 236 may access the p-frames as needed.

MAC 206 may provide data blocks (including, e.g., data blocks that have been scheduled and/or fragmented) to PHY 216, e.g., at MAC-PHY link 232 (which may be, for example, a serial or a parallel bus, without limitation). PHY 216 may receive the data blocks and transmit the data blocks at a physical medium. For example, protocol sublayers 222 may transmit the data blocks, e.g., one or more bits at a time at the physical medium, e.g., as charges on a line or antenna. Additionally, PHY 216 may receive data blocks at the physical medium and provide the data blocks to MAC 206.

Additionally, PHY 216 may include higher-layer-processing module 218. Higher-layer-processing module 218 may implement higher-layer processing (e.g., processing associated with any of OSI layers 2-7). For example, PHY 216 may implement MACsec. For example, higher-layer-processing module 218 may include MACsec module 220 that may implement MACsec. The higher-layer processing may involve adding data to data blocks before transmitting the data blocks and removing data from data blocks when receiving data blocks.

Host 204 and/or PHY 216 of device 202 may implement one or more examples such that as PHY 216 implements higher-layer processing (e.g., MACsec) on egressing data blocks, the higher-layer processing does not disrupt time-sensitive operations (e.g., TSN), e.g., implemented at MAC 206. Additionally or alternatively, PHY 216 may implement one or more examples such that the higher-layer processing (e.g., MACsec) on incoming data block does not render the incoming data blocks too short.

Figures 3A, 3B:
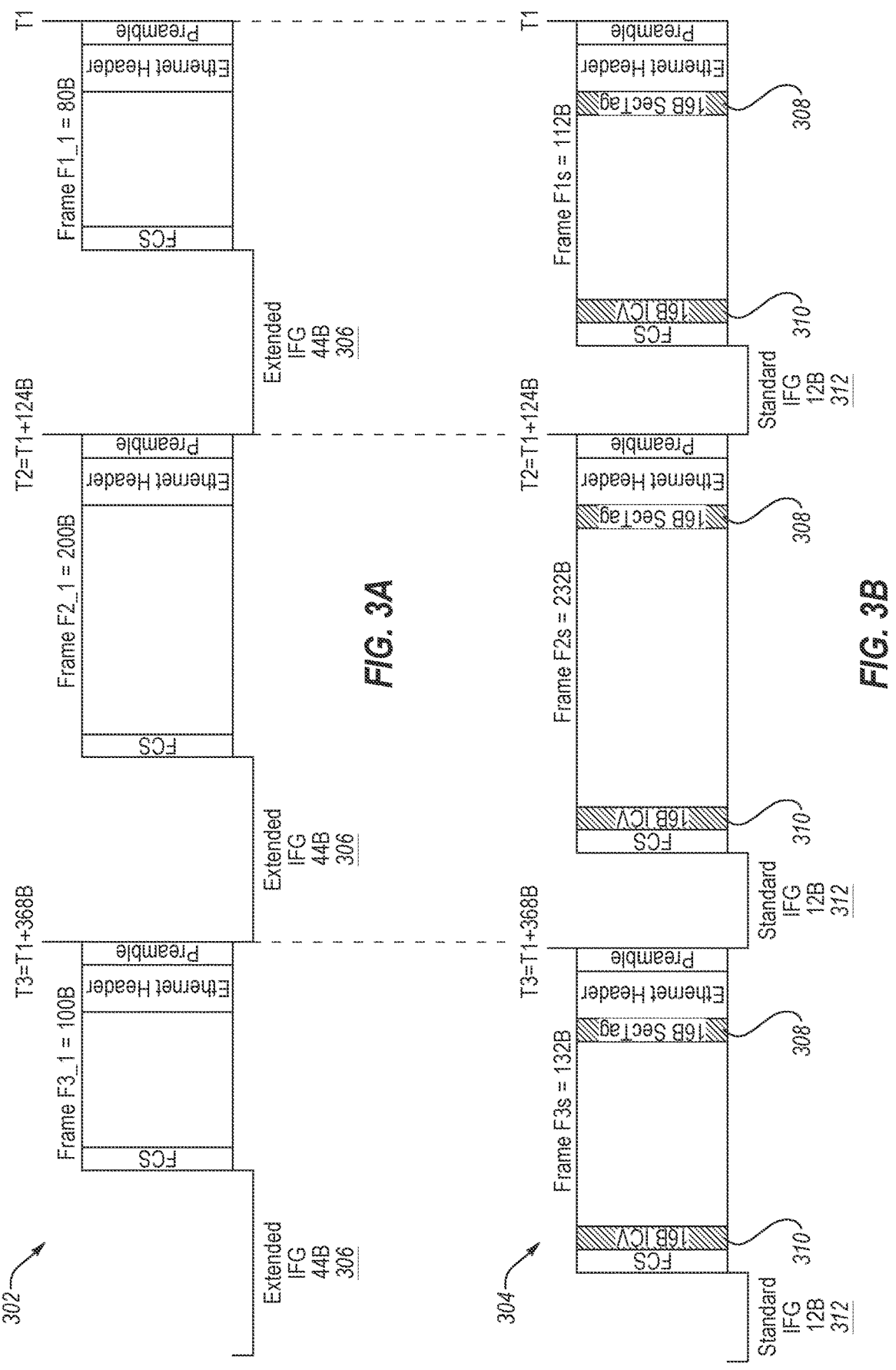
FIG. 3A illustrates an example of timing of example outgoing data blocks prepared for transmission at a MAC according to one or more examples.
FIG. 3B illustrates an example of timing of example outgoing data blocks prepared for egressing at a PHY according to one or more examples.
Figures 4A, 4B:
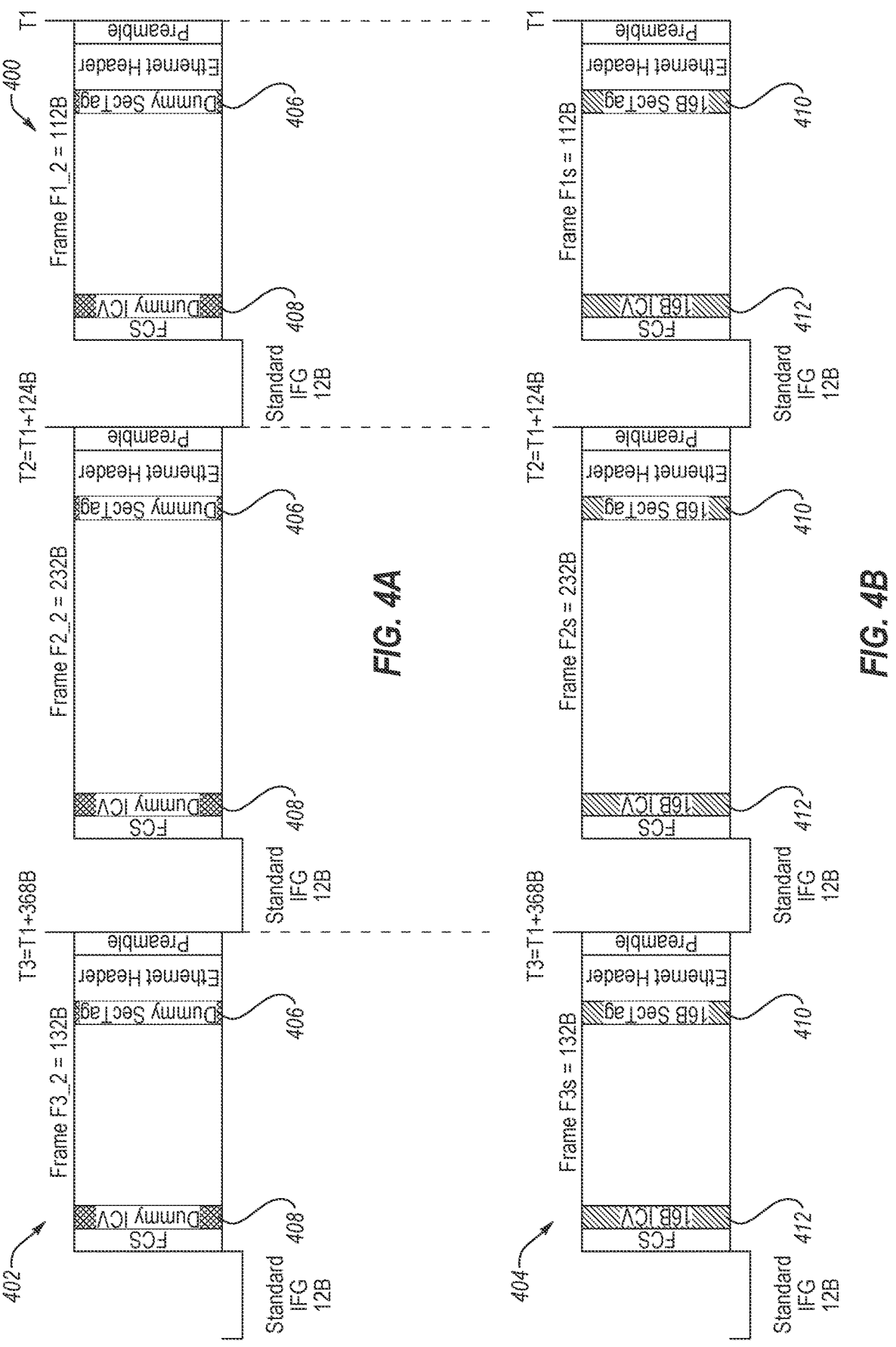
FIG. 4A illustrates another example of timing of example outgoing data blocks prepared for transmission at a MAC according to one or more examples.
FIG. 4B illustrates another example of timing of example outgoing data blocks prepared for egressing at a PHY according to one or more examples.
Figures 5A, 5B:
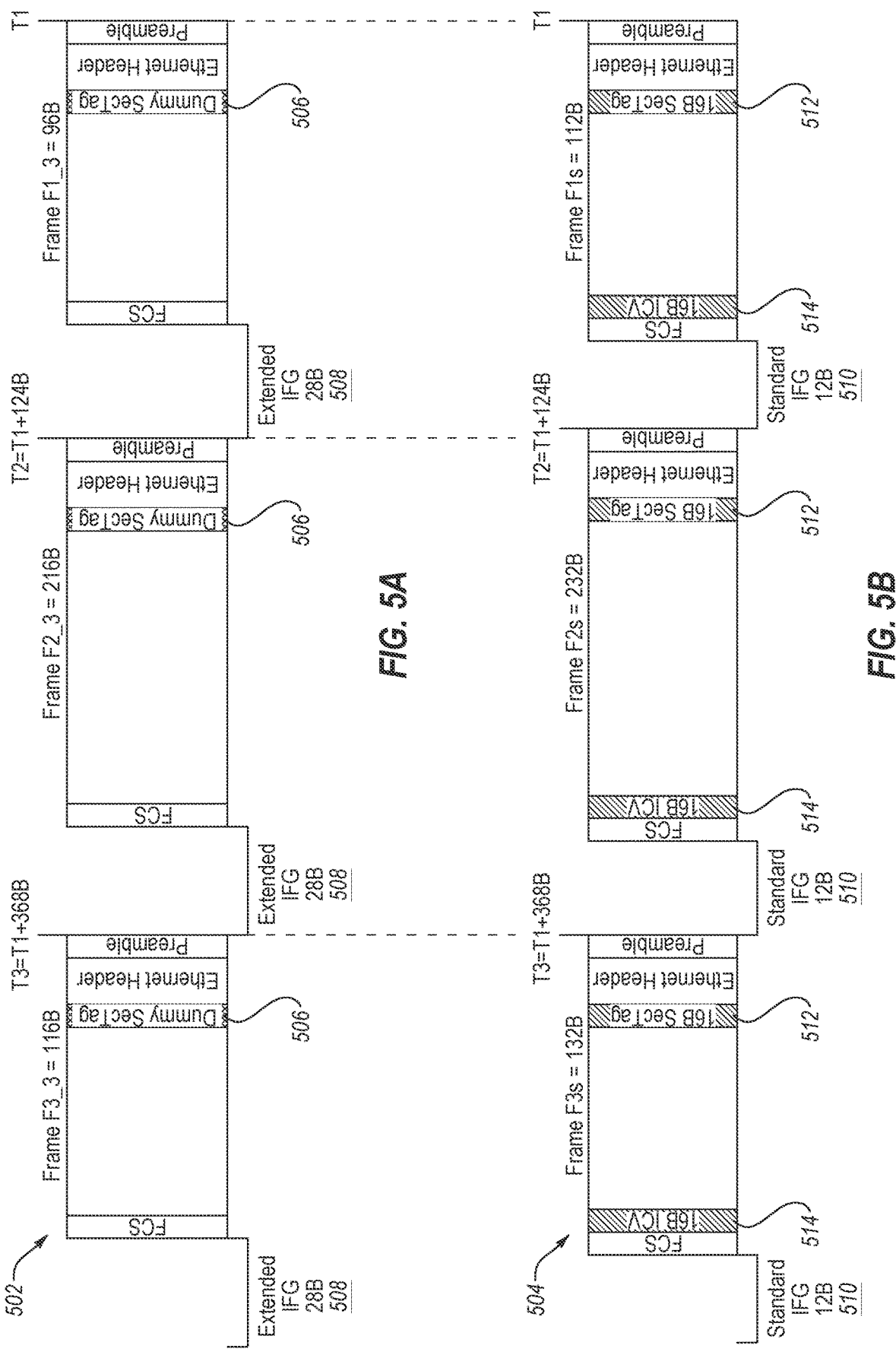
FIG. 5A illustrates yet another example of timing of example outgoing data blocks prepared for transmission at a MAC according to one or more examples.
FIG. 5B illustrates yet another example of timing of example outgoing data blocks prepared for egressing at a PHY according to one or more examples.

FIG. 3A, FIG. 4A, and FIG. 5A, illustrate examples of timing of example outgoing data blocks prepared for transmission at a MAC (e.g., MAC 206 of FIG. 2) according to one or more examples. The data blocks of FIG. 3A, FIG. 4A, and FIG. 5A may be provided by a MAC of a sender to a PHY of the sender at a MAC-PHY link (e.g., MAC-PHY link 232 of FIG. 2). FIG. 3B, FIG. 4B, and FIG. 5B illustrate an example of timing of example outgoing data blocks prepared for egressing at a PHY (e.g., PHY 216 of FIG. 2) according to one or more examples. The outgoing data blocks of FIG. 3B, FIG. 4B, and FIG. 5B may be the outgoing data blocks of FIG. 3A, FIG. 4A, and FIG. 5A, respectively, after implementation of a higher-layer processing at the PHY of the sender. The outgoing data blocks of FIG. 3B, FIG. 4B, and FIG. 5B may have been prepared to be egressed by a PHY of the sender at an Ethernet link (e.g., Ethernet link 234 of FIG. 2). The outgoing data blocks of FIG. 3B, FIG. 4B, and/or FIG. 5B may be received by a system that implements MACsec and TSN at any suitable component or device. For example, a recipient of the outgoing data blocks of FIG. 3B, FIG. 4B, and/or FIG. 5B may implement MACsec at a PHY or a MAC.

In the present disclosure, timing diagrams (e.g., as illustrated in FIG. 3A-FIG. 8B) illustrate data blocks ordered from a first on the right to a last on the left. The data blocks may be transmitted at a data rate. Thus, the size (e.g., in bytes) of the data blocks and timing may be related by a data rate. And, in the present disclosure, descriptions of timing may be in relation to a number of seconds and/or bytes. For example, a time may be described as after another time by a number of bytes. The data blocks and/or portions thereof are not illustrated to scale.

FIG. 3A illustrates an example of timing of data blocks for transmission after implementation of a time-sensitive scheduling function (e.g., TSN) (e.g., at a MAC) according to one or more examples. FIG. 3B illustrates an example of timing of corresponding egressing data blocks after implementation of a higher-layer processing associated with a higher-level protocol (e.g., MACsec), e.g., at a PHY. In particular, FIG. 3A illustrates adjusted timing 302, which is timing of data blocks for transmission after implementation of a TSN at the MAC while also anticipating the timing adjustment to be incurred due to later applying a MACsec operation at the PHY according to one or more examples. FIG. 3B illustrates egressing-frame timing 304, which is a timing of the data blocks after implementation of MACsec, e.g., at the PHY.

Adjusted timing 302 includes data blocks: Frame F1_1, Frame F2_1, and Frame F3_1. Each of the data blocks includes a preamble, an Ethernet header, a payload (not labeled), and a Frame Check Sequence (FCS).

Egressing-frame timing 304 includes data blocks: Frame F1s, Frame F2s, and Frame F3s. Each of the data blocks of egressing-frame timing 304 corresponds to a data block of adjusted timing 302. In particular, the data blocks of egressing-frame timing 304 may be the data blocks of adjusted timing 302 after the implementation of MACsec. The implementation of MACsec may include encrypting at least a portion (e.g., the payload) of one or more data blocks, adding a security tag (SecTag) to one or more data blocks, and/or adding integrity detection data (ICV) to one or more data blocks. The implementation of MACsec may allow for authentication (e.g., by adding the ICV) and/or confidentiality (e.g., through encryption). For example, Frame F1s may be Frame F1_1 after the implementation of MACsec, i.e., including SecTag 308 and ICV 310.

According to one or more examples, each of the data blocks of adjusted timing 302 is separated by an extended inter-frame gap (IFG), e.g., extended IFG 306. Extended IFG 306 may be longer than a standard IFG, e.g., standard IFGs 312. Extended IFG 306 may be longer than standard IFGs 312 by a duration related to data added to the data blocks by MACsec. In particular, extended IFGs 306 may be longer than standard IFGs 312 by a duration of time (or a number of bytes) that corresponds to the size of SecTag 308 and ICV 310. As a specific, non-limiting example, standard IFG 312 may be 12 bytes long, SecTag 308 may be 16 bytes long, and ICV 310 may be 16 bytes long, thus, extended IFG 306 may be 44 bytes long.

For example, in the example illustrated in FIG. 3B, where Frame F1s is 112 bytes long (i.e., 80 bytes of the original frame F1_1 plus 16 bytes for SecTag 308 and 16 bytes for ICV 310) and where standard IFG 312 is 12 bytes long, Frame F2s starts at T2, which is T1 (the time at which the Frame F1s started) plus 124 bytes (i.e., 112 bytes for Frame F1s and 12 bytes for standard IFG 312). And, in the example illustrated in FIG. 3A, where frame F1_1 is 80 bytes long and extended IFG 306 is 44 bytes long, F2_1 starts at T2, which is T1 plus 124 bytes (i.e., the 80 bytes of Frame F1_1 plus the 44 bytes of extended IFG 306). Likewise T3 (the start time of Frame F3_1 and Frame F3s) is 368 bytes after T1 in both FIG. 3A and FIG. 3B. Thus, adjusted timing 302 of FIG. 3A is such that implementation of MACsec at a PHY (e.g., as illustrated in FIG. 3B) does not disrupt time-sensitivity of the data blocks.

In some cases, extended IFGs 306 may be longer than standard IFGs 312 by a duration of time (or a number of bytes) that is longer than the corresponding size of SecTag 308 and ICV 310. For example, in some cases, not all frames of a series of frames may be encrypted and/or some frames of the string of frames may be encrypted using different encryption. In such cases, it may be appropriate to have extended IFGs that all correspond to the size of the largest SecTag and ICV, and standard IFG 312, of the series of frames.

Because adjusted timing 302 includes extended IFG 306 (rather than standard IFG 312), adjusted timing 302 may be such that after implementation of MACsec (in particular the addition of SecTag 308 and ICV 310), the timing of egressing-frame timing 304 is according to TSN. In particular, according to TSN, a receiver may expect data blocks to begin at certain times (e.g., T1, T2, and T3). Adjusted timing 302 (in particular, the extension of extended IFG 306 compared to standard IFG 312) may cause the data blocks of egressing-frame timing 304 (i.e., after the implementation of MACsec) to begin at the certain times (e.g., T1, T2, and T3). Thus, one or more examples may allow implementation of a higher-layer protocol (e.g., MACsec) (e.g., at a PHY) after implementation of a time-sensitive protocol (e.g., TSN) (e.g., at a MAC) without disrupting the time-sensitive nature of the data blocks.

To implement the example described with regard to FIG. 3A, a MAC (e.g., MAC 206 of FIG. 2) may include extended IFGs 306 of a particular duration. In particular, the MAC may include extended IFGs 306 that have a duration that corresponds to a standard IFG 312 plus a size of bytes that are to be added at a PHY according to the higher-layer protocol (e.g., MACsec). Additionally or alternatively, in some cases, the MAC may include extra-extended IFGs (not illustrated) that have a duration that is greater than a standard IFG 312 plus a size of bytes that are to be added at the PHY by higher-level processing.

FIG. 4A illustrates an example of timing of data blocks for transmission after implementation of a timing protocol at a MAC according to one or more examples. FIG. 4B illustrates an example of timing of corresponding egressing data blocks after implementation of higher-layer processing associated with a higher-level protocol (e.g., MACsec), e.g., at a PHY. In particular, FIG. 4A illustrates adjusted timing 402, which is timing of data blocks for transmission after implementation of a TSN at the MAC according to one or more examples. FIG. 4B illustrates egressing-frame timing 404, which is a timing of the data blocks after implementation of MACsec, e.g., at the PHY.

Adjusted timing 402 includes data blocks: Frame F1_2, Frame F2_2, and Frame F3_2. Each of the data blocks includes a preamble, an Ethernet header, a payload (not labeled), and an FCS.

Egressing-frame timing 404 includes data blocks: Frame F1s, Frame F2s, and Frame F3s. Each of the data blocks of egressing-frame timing 404 corresponds to a data block of adjusted timing 402. In particular, the data blocks of egressing-frame timing 404 may be the data blocks of adjusted timing 402 after the implementation of MACsec. The implementation of MACsec may include encrypting at least a portion (e.g., the payload) of one or more data blocks, adding a SecTag to one or more data blocks, and/or adding an ICV to one or more data blocks. For example, Frame F1s, may be Frame F1_2 after the implementation of MACsec, i.e., including SecTag 410 and ICV 412.

According to one or more examples, each of the data blocks of adjusted timing 402 includes dummy SecTag 406 and dummy ICV 408. The size of dummy SecTag 406 may correspond to the size of SecTag 410 and the size of dummy ICV 408 may correspond to the size of ICV 412. As a specific, non-limiting example, SecTag 410 may be 16 bytes long, thus, dummy SecTag 406 may be 16 bytes long. Likewise, ICV 412 may be 16 bytes long and dummy ICV 408 may be 16 bytes long. When MACsec is implemented (e.g., at the PHY), dummy SecTag 406 and dummy ICV 408 may be overwritten by SecTag 410 and ICV 412, respectively.

Because adjusted timing 402 includes dummy SecTag 406 and dummy ICV 408, adjusted egress timing 400 may be such that after implementation of MACsec, the timing of egressing-frame timing 404 is according to TSN. In particular, according to TSN, a receiver may expect data blocks to begin at certain times (e.g., T1, T2, and T3). Adjusted timing 402 (in particular, the inclusion of dummy SecTag 406 and dummy ICV 408) may cause the data blocks of egressing-frame timing 404 (i.e., after the implementation of MACsec) to begin at the certain times (e.g., T1, T2, and T3). Thus, one or more examples may allow implementation of a higher-layer protocol (e.g., MACsec) at a PHY after implementation of a time-sensitive protocol (e.g., TSN) (e.g., at a MAC) without disrupting the time-sensitive nature of the data blocks.

For example, in the example illustrated in FIG. 4B, where Frame F1s is 112 bytes long (i.e., 80 bytes of frame F1_1 plus 16 bytes for SecTag 410 and 16 bytes for ICV 412) and where the standard IFG is 12 bytes long, Frame F2s starts at T2, which is T1 (the time at which the Frame F1s started) plus 124 bytes (i.e., 112 bytes for Frame F1s and 12 bytes for the standard IFG). And, in the example illustrated in FIG. 4A, where frame F1_2 is 112 bytes long (i.e., 80 bytes of the original frame plus 16 bytes for dummy SecTag 406 and 16 bytes for dummy ICV 408) and the standard IFG is 12 bytes long, F2_2 starts at T2, which is T1 plus 124 bytes (i.e., the 112 bytes of Frame F1_2 plus the 12 bytes of the standard IFG). Likewise T3 (the start time of Frame F3_2 and Frame F3s) is 368 bytes after T1 in both FIG. 4A and FIG. 4B. Thus, adjusted timing 402 of FIG. 4A is such that implementation of MACsec at a PHY (e.g., as illustrated in FIG. 4B) does not disrupt time-sensitivity of the data blocks.

To implement the example described with regard to FIG. 4A, a MAC client (e.g., MAC client 208 of FIG. 2), a queue module (e.g., queue module 212 of FIG. 2) or a host application (e.g., host application 236 of FIG. 2) may include dummy data of a particular size in data blocks. In particular, the MAC client, queue module, and/or host application may include, in data blocks, dummy data that has a size that corresponds to a size of bytes that are to be added at a PHY according to the higher-layer processing associated with a higher-level protocol (e.g., MACsec). Further, the PHY may overwrite the dummy data with the additional data rather than adding the additional data.

FIG. 5A illustrates an example of timing of data blocks for transmission after implementation of a timing protocol at a MAC according to one or more examples. FIG. 5B illustrates an example of timing of corresponding egressing data blocks after implementation of a higher-layer processing associated with a higher-level protocol (e.g., MACsec), e.g., at a PHY. In particular, FIG. 5A illustrates adjusted timing 502, which is timing of data blocks for transmission after implementation of a TSN at the MAC according to one or more examples. FIG. 5B illustrates egressing-frame timing 504, which is a timing of the data blocks after implementation of MACsec, e.g., at the PHY.

Adjusted timing 502 includes data blocks: Frame F1_3, Frame F2_3, and Frame F3_3. Each of the data blocks includes a preamble, an Ethernet header, a payload (not labeled), and an FCS.

Egressing-frame timing 504 includes data blocks: Frame F1s, Frame F2s, and Frame F3s. Each of the data blocks of egressing-frame timing 504 corresponds to a data block of adjusted timing 502. In particular, the data blocks of egressing-frame timing 504 may be the data blocks of adjusted timing 502 after the implementation of MACsec. The implementation of MACsec may include encrypting at least a portion (e.g., the payload) of one or more data blocks, adding a SecTag to one or more data blocks, and/or adding an ICV to one or more data blocks. For example, Frame F1s, may be Frame F1_3 after the implementation of MACsec, i.e., including SecTag 512 and ICV 514.

According to one or more examples, similar to what was described with regard to FIG. 4A, each of the data blocks of adjusted timing 502 include dummy SecTag 506. The size of dummy SecTag 506 may correspond to a size of some of the bytes (e.g., SecTag 512) that are to be added at a PHY according to a higher-layer processing associated with a higher-layer protocol (e.g., MACsec). As a specific, non-limiting example, SecTag 512 may be 16 bytes long and thus dummy SecTag 506 may be 16 bytes long.

Additionally, according to one or more examples, similar to what was described with regard to FIG. 3A, each of the frames of adjusted timing 502 is separated by extended IFG 508. Extended IFG 508 may be longer than standard IFG 510 by a duration corresponding to (or, in some cases, greater than) a size of some of the bytes (e.g., ICV 514) that are to be added at a PHY according to the higher-layer processing associated with the higher-layer protocol (e.g., MACsec). As a specific, non-limiting example, standard IFG 510 may be 12 bytes long and ICV 514 may be 16 bytes long and thus, extended IFG 508 may be 28 bytes long (or longer).

Because adjusted timing 502 includes extended IFG 508 (rather than standard IFG 510) and dummy SecTag 506, adjusted timing 502 may be such that after implementation of MACsec (in particular the addition of SecTag 512 and ICV 514), the timing of egressing-frame timing 504 is according to TSN. In particular, according to TSN, a receiver may expect data blocks to begin at certain times (e.g., T1, T2, and T3). Adjusted timing 502 (in particular, the extension of extended IFG 508 compared to standard IFG 510 and the inclusion of dummy SecTag 506) may cause the data blocks of egressing-frame timing 504 (i.e., after the implementation of MACsec) to begin at the certain times (e.g., T1, T2, and T3). Thus, one or more examples may allow implementation of a higher-layer processing associated with a higher-layer protocol (e.g., MACsec) at a PHY after implementation of a time-sensitive protocol (e.g., TSN) (e.g., at a MAC) without disrupting the time-sensitive nature of the data blocks.

For example, in the example illustrated in FIG. 5B, where Frame F1*s* is 112 bytes long (i.e., 80 bytes of frame F1_1 plus 16 bytes for SecTag 512 and 16 bytes for ICV 514) and where standard IFG 510 is 12 bytes long, Frame F2*s* starts at T2, which is T1 (the time at which the Frame F1*s* started) plus 124 bytes (i.e., 112 bytes for Frame F1*s* and 12 bytes for standard IFG 510). And, in the example illustrated in FIG. 5A, where frame F1_3 is 96 bytes long (i.e., 80 bytes of frame F1_1 plus 16 bytes for dummy SecTag 506) and extended IFG 508 is 28 bytes long (i.e., the size of standard IFG 510 plus the size of ICV 514), F2_3 starts at T2, which is T1 plus 124 bytes (i.e., the 96 bytes of Frame F1_3 plus the 28 bytes of extended IFG 508). Likewise T3 (the start time of Frame F3_3 and Frame F3*s*) is 368 bytes after T1 in both FIG. 5A and FIG. 5B. Thus, adjusted timing 502 of FIG. 5A is such that implementation of MACsec at a PHY (e.g., as illustrated in FIG. 5B) does not disrupt time-sensitivity of the data blocks.

To implement the example described with regard to FIG. 5A, a MAC (e.g., MAC 206) may include IFGs of a particular duration. In particular, the MAC may include IFGs that have a duration that corresponds to a standard IFG plus a size of some of the bytes (e.g., ICV 514) that are to be added at a PHY according to the higher-layer protocol (e.g., MACsec). Additionally, to implement the example described with regard to FIG. 5A, a MAC client (e.g., MAC client 208), a queue module (e.g., queue module 212) or a host application (e.g., host application 236) may include dummy data of a particular size in frames. In particular, the MAC client, the queue module and/or the host application may include in frames dummy data that has a size that corresponds to a size of some of the bytes (e.g., SecTag 512) that are to be added at a PHY according to the higher-layer protocol (e.g., MACsec). Further, the PHY may overwrite the dummy data with the additional data rather than adding the additional data.

Figures 6A, 6B:
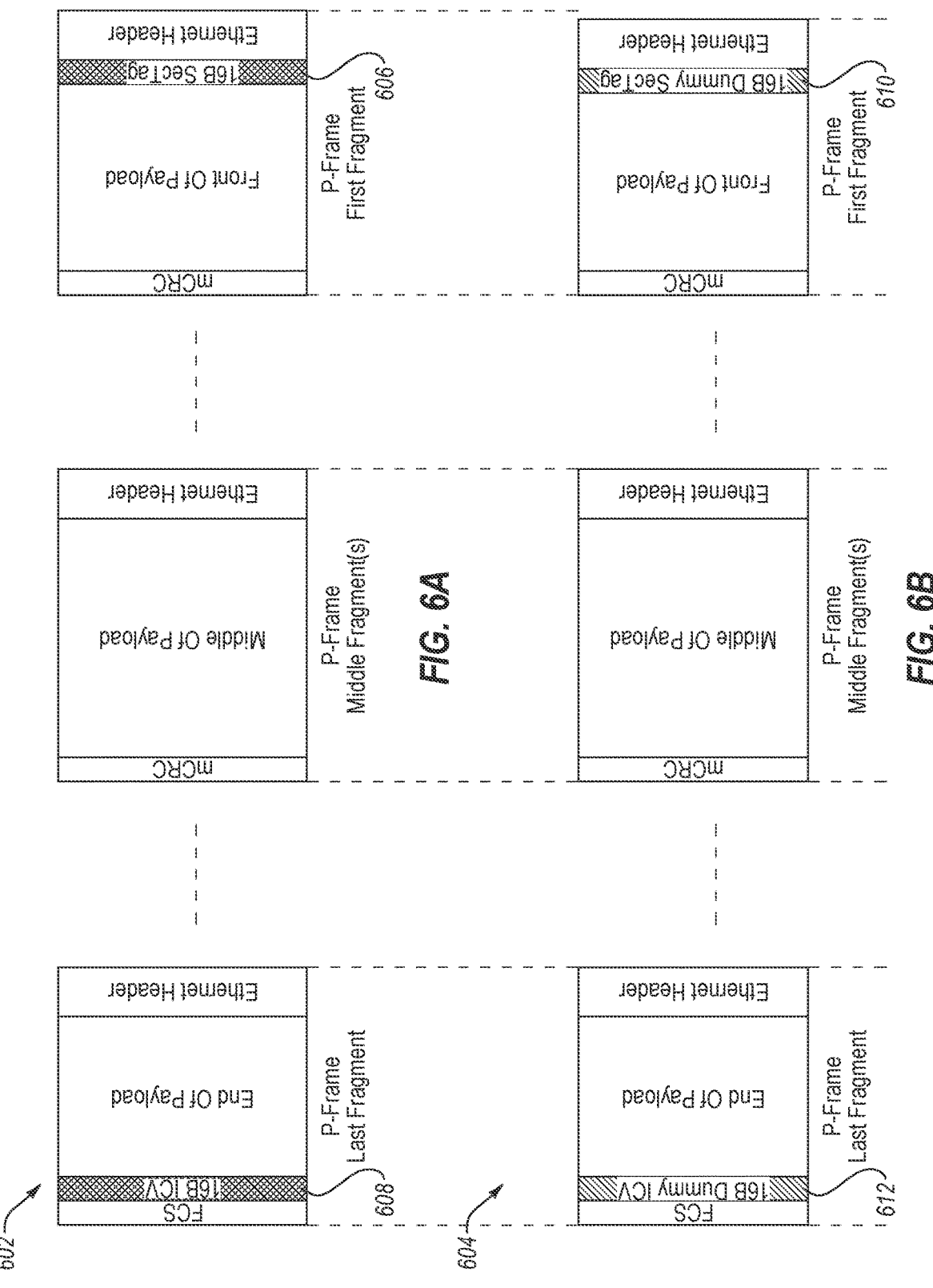
FIG. 6A illustrates an example of timing of example incoming data blocks received at a PHY according to one or more examples.
FIG. 6B illustrates an example of timing of example incoming data blocks provided to a MAC according to one or more examples.
Figures 7A, 7B:
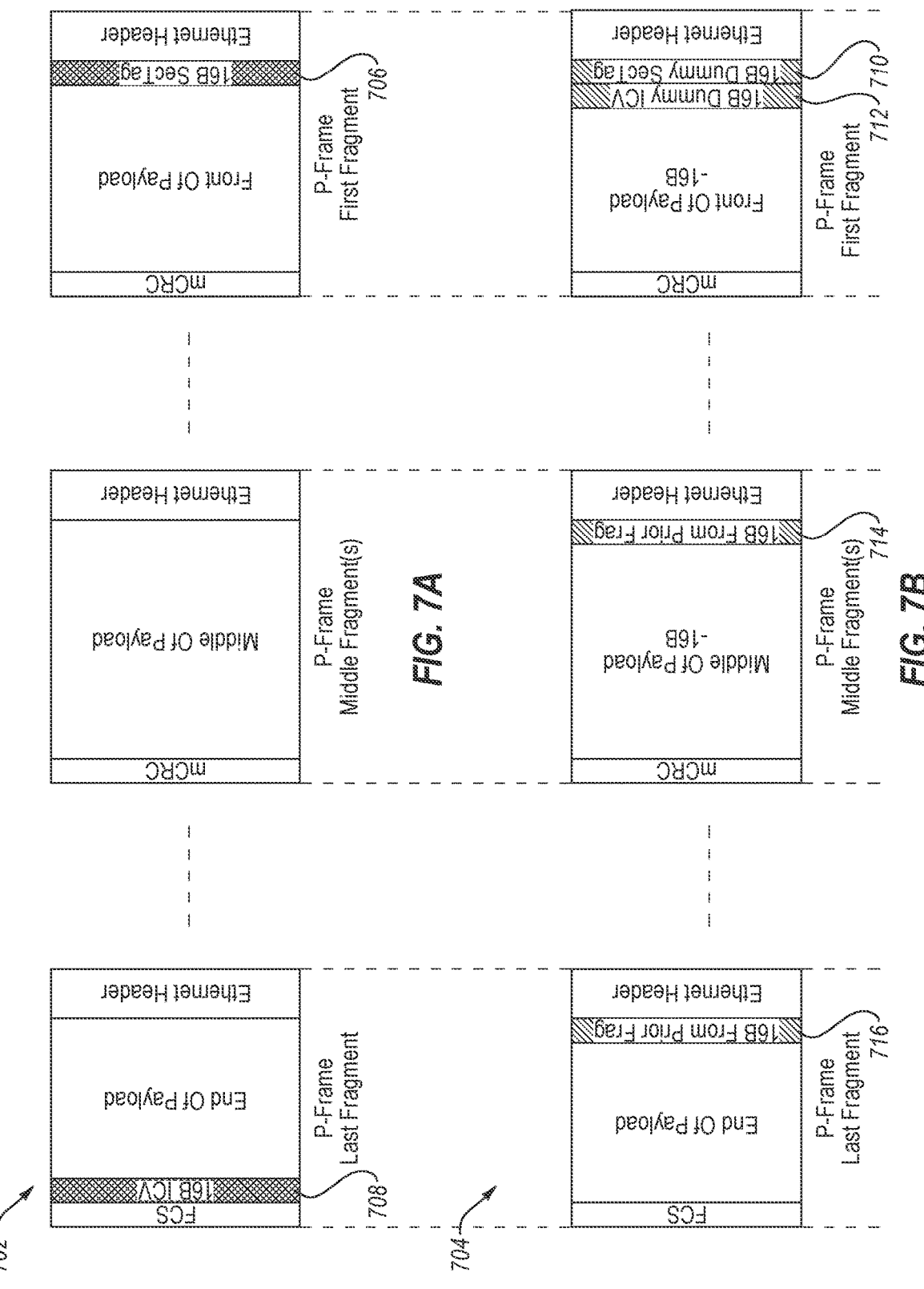
FIG. 7A illustrates another example of timing of example incoming data blocks received at a PHY according to one or more examples.
FIG. 7B illustrates another example of timing of example incoming data blocks provided to a MAC according to one or more examples.
Figures 8A, 8B:
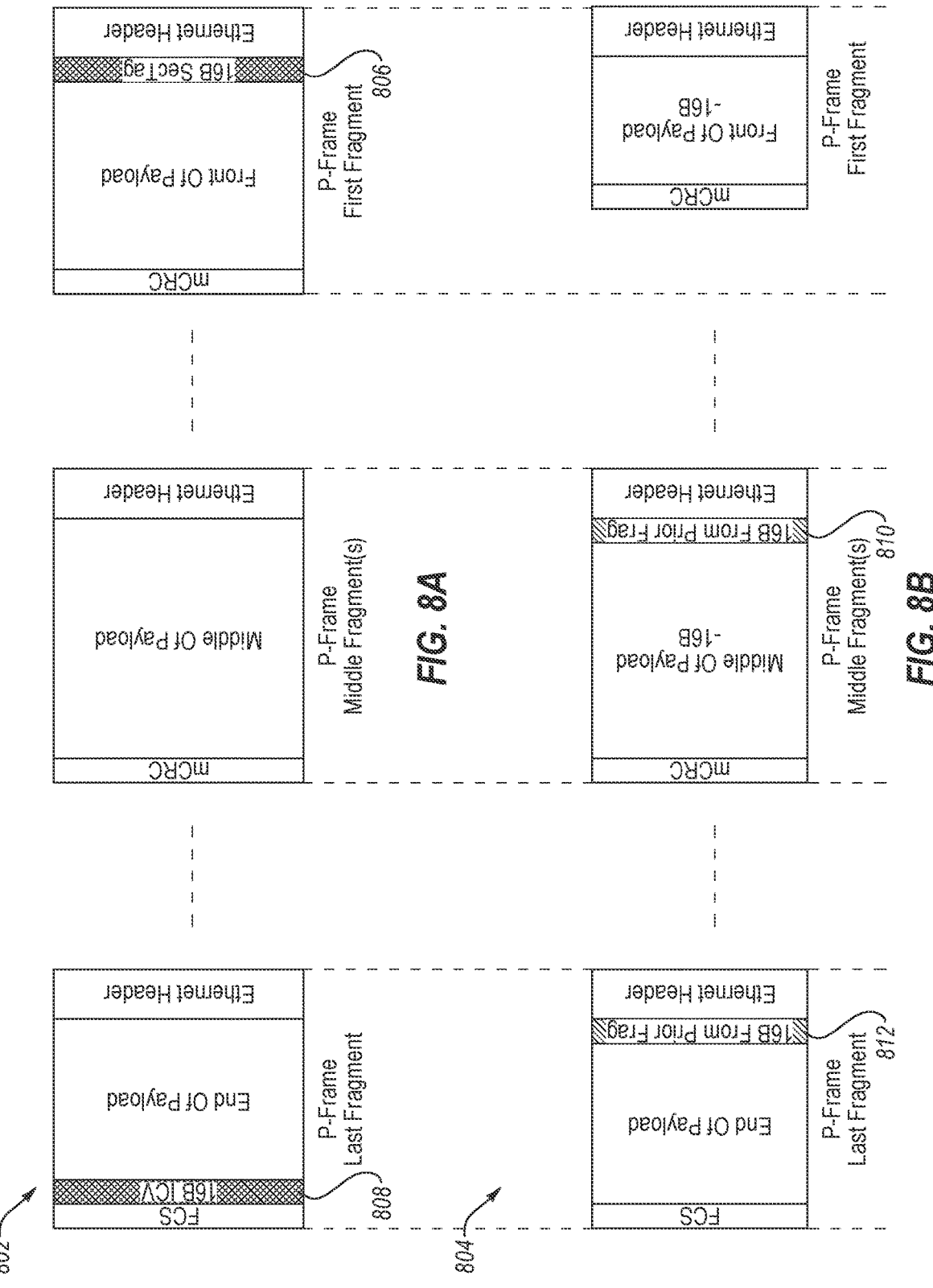
FIG. 8A illustrates yet another example of timing of example incoming data blocks received at a PHY according to one or more examples.
FIG. 8B illustrates yet another example of timing of example incoming data blocks provided to a MAC according to one or more examples.

FIG. 6A, FIG. 7A, and FIG. 8A illustrate examples of timing of example incoming data blocks received at a PHY (e.g., PHY 216 of FIG. 2) according to one or more examples. For example, the incoming data blocks of FIG. 6A, FIG. 7A, and FIG. 8A may be received by a PHY of a recipient at an Ethernet link. FIG. 6B, FIG. 7B, and FIG. 8B illustrate examples of timing of example incoming data blocks provided to a MAC (e.g., MAC 206 of FIG. 2) according to one or more examples. The incoming data blocks of FIG. 6B, FIG. 7B, and FIG. 8B, may be the data blocks at FIG. 6A, FIG. 7A, and FIG. 8A, respectively, e.g., after processing at the PHY. For example, the incoming data blocks of FIG. 6B, FIG. 7B, and FIG. 8B may be provided by a PHY of a recipient to a MAC of the recipient at a MAC-PHY link. The incoming data blocks of FIG. 6A, FIG. 7A, and/or FIG. 8A may have been sent by a system which implements MACsec and TSN at any suitable component or device. For example, a sender of the incoming data blocks of FIG. 6A, FIG. 7A, and/or FIG. 8A may implement MACsec at a PHY or a MAC.

FIG. 6A illustrates an example of timing of data blocks (e.g., received at a PHY), the data blocks including data associated with a higher-layer processing associated with a higher-layer protocol (e.g., MACsec). FIG. 6B illustrates an example of timing of corresponding data blocks (e.g., provided to the MAC) according to one or more examples. In particular, FIG. 6A illustrates ingress frame-fragment timing 602, which is timing of frame fragments received at the PHY. FIG. 6B illustrates adjusted-frame-fragment timing 604, which is a timing of corresponding frame fragments provided to the MAC by the PHY according to one or more examples.

Ingress frame-fragment timing 602 includes data blocks: first fragment, zero or more middle fragment(s), and last fragment. In FIG. 6A, three frame fragments are illustrated for descriptive purposes. In other examples, ingress frame-fragment timing 602 may include any number (zero or greater) of middle frame fragments. Each of the illustrated data blocks of ingress frame-fragment timing 602 may be a fragment of a single pre-emptible frame, denoted P-Frame, e.g., the single pre-emptible frame having been fragmented according to a fragmentations protocol (e.g., frame preemption, which may be included in TSN). Each of the data blocks of ingress frame-fragment timing 602 includes an Ethernet header, a respective payload portion (i.e., front of payload, middle of payload, and end of payload, respectively). Each of the data blocks except the last also includes an mPacket cyclic redundancy check (mCRC). The last data block includes a Frame Check Sequence (FCS). The first fragment of the ingress frame-fragment timing 602 includes SecTag 606 and the last fragment of the ingress frame-fragment timing 602 includes ICV 608. SecTag 606 and ICV 608 may have been added to the frame fragments according to the MACsec protocol implemented at a sender.

Adjusted-frame-fragment timing 604 includes data blocks: first fragment, zero or more middle fragment(s), and last fragment. In FIG. 6B, three frame fragments are illustrated for descriptive purposes. In other examples, adjusted-frame-fragment timing 604 may include any number (zero or greater) of middle frame fragments. Each of the data blocks of adjusted-frame-fragment timing 604 corresponds to a data block of ingress frame-fragment timing 602. In particular, the data blocks of adjusted-frame-fragment timing 604 may be the data blocks of ingress frame-fragment timing 602 after the implementation of MACsec at the receiver. The implementation of MACsec at the receiver may include decrypting at least a portion (e.g., the payload) of one or more data blocks, removing a SecTag 606 from the first data block of the one or more data blocks, and/or removing ICV 608 from the last data block of the one or more data blocks. Further, the implementation of MACsec may include security checks including authentication of the frame based on the ICV 608. For example, the first fragment of adjusted-frame-fragment timing 604 may be the first fragment of ingress frame-fragment timing 602 after decryption and removal of SecTag 606.

In some examples, a PHY may remove SecTag 606 and ICV 608 to implement the MACsec protocol. In some cases, removing SecTag 606 and/or ICV 608 from a data block may render the data block too short. For example, there may be a constraint on frame-fragment length (e.g., a constraint that requires frame fragments to be 64 bytes or longer), and, after removal of ICV 608, the last frame fragment may not meet the constraint.

According to one or more examples, dummy data may be added to one or more of the frame fragments (e.g., at the PHY) to ensure that the frame fragments are not too short. For example, at the PHY, Dummy SecTag 610 may be added to the first frame fragment of adjusted-frame-fragment timing 604 and Dummy ICV 612 may be added to the last fragment of adjusted-frame-fragment timing 604. The size of dummy SecTag 610 may correspond to the size of SecTag 606 and the size of dummy ICV 612 may correspond to the size of ICV 608. As a specific, non-limiting example, dummy SecTag 610 may be 16 bytes long and thus, SecTag 606 may be 16 bytes long. Likewise, dummy ICV 612 may be 16 bytes long and thus ICV 608 may be 16 bytes long.

FIG. 7A illustrates an example of timing of data blocks (e.g., received at a PHY), the data blocks including data associated with a higher-layer processing associated with a higher-layer protocol (e.g., MACsec). FIG. 7B illustrates an example of timing of corresponding data blocks (e.g., provided to the MAC) according to one or more examples. In particular, FIG. 7A illustrates ingress frame-fragment timing 702, which is timing of frame fragments received at the PHY. FIG. 7B illustrates adjusted-frame-fragment timing 704, which is a timing of corresponding frame fragments provided to the MAC by the PHY according to one or more examples.

Ingress frame-fragment timing 702 includes data blocks: first fragment, zero or more middle fragment(s), and last fragment. In FIG. 7A, three frame fragments are illustrated for descriptive purposes. In other examples, ingress frame-fragment timing 702 may include any number (zero or greater) of middle frame fragments. Each of the illustrated data blocks of ingress frame-fragment timing 702 may be a fragment of a single pre-emptible frame, e.g., the single pre-emptible frame having been fragmented according to a fragmentations protocol (e.g., which may be included in TSN). Each of the data blocks of ingress frame-fragment timing 702 includes an Ethernet header, a respective payload portion (i.e., front of payload, middle of payload, and end of payload, respectively). Each of the data blocks except the last also includes an mPacket cyclic redundancy check (mCRC). The last data block includes a Frame Check Sequence (FCS). The first fragment of the ingress frame-fragment timing 702 includes SecTag 706 and the last fragment of the ingress frame-fragment timing 702 includes ICV 708. SecTag 706 and ICV 708 may have been added to the frame fragments according to the MACsec protocol implemented at a sender.

Adjusted-frame-fragment timing 704 includes data blocks: first fragment, zero or more middle fragment(s), and last fragment. In FIG. 7B, three frame fragments are illustrated for descriptive purposes. In other examples, adjusted-frame-fragment timing 704 may include any number (zero or greater) of middle frame fragments. Each of the data blocks of adjusted-frame-fragment timing 704 corresponds to a data block of ingress frame-fragment timing 702. In particular, the data blocks of adjusted-frame-fragment timing 704 may be the data blocks of ingress frame-fragment timing 702 after the implementation of MACsec at the receiver. The implementation of MACsec at the receiver may include decrypting at least a portion (e.g., the payload) of one or more data blocks, removing a SecTag from the first data block of the one or more data blocks, and/or removing ICV from the last data block of the one or more data blocks. For example, the first fragment of adjusted-frame-fragment timing 704 may be the first fragment of ingress frame-fragment timing 702 after decryption and removal of SecTag 706.

According to one or more examples, dummy data may be added to one or more of the frame fragments (e.g., at the PHY) to ensure that the frame fragments are not too short. For example, at the PHY, Dummy SecTag 710 and dummy ICV 712 may be added to the first frame fragment of adjusted-frame-fragment timing 704. In some examples, dummy SecTag 710 may occupy the position within the first frame fragment formerly occupied by SecTag 706, e.g., dummy SecTag 710 may replace SecTag 706 in the first frame fragment of adjusted-frame-fragment timing 704. The size of dummy SecTag 710 may correspond to the size of SecTag 706 and the size of dummy ICV 712 may correspond to the size of ICV 708. As a specific, non-limiting example, SecTag 706 may be 16 bytes long, and thus, dummy SecTag 710 may be 16 bytes long. Likewise, ICV 708 may be 16 bytes long, and thus, dummy ICV 712 may be 16 bytes long.

Additionally, a portion from a prior fragment may be taken from each frame fragment (except the last) and added to a subsequent frame fragment. For example, in a case where there are zero middle frame fragments, a portion of the first frame fragment may be taken from the first frame fragment and added to the last frame fragment as portion-from-prior fragment 716. As another example, in a case where there are one or more middle frame fragments, a portion may be taken from the first frame fragment and added to a second frame fragment as portion-from-prior fragment 714, a portion may be taken from the second frame fragment and added to a third frame fragment as portion-from-prior fragment 714 and so on until a portion is taken from the penultimate frame fragment and added to a last frame fragment as portion-from-prior fragment 716. A size of the portion may correspond to a size of ICV 708. As a specific, non-limiting example, ICV 708 may be 16 bytes long and the size of the portion-from-prior-fragment 714 and portion-from-prior fragment 716 may each be 16 bytes long.

Adding portion-from-prior fragment 716 to the last frame fragment may ensure that the last frame fragment is not too short. Adding dummy ICV 712 and dummy SecTag 710 to the first frame fragment may ensure that the first frame fragment is not too short. Each of the first through penultimate frame fragments have a portion removed and a portion of equal size added. Thus, the first through penultimate frame fragments may retain their size.

Additionally or alternatively, the portion-from-prior fragment 714 and portion-from-prior fragment 716 (and the dummy SecTag 710 and Dummy ICV 712) may be added close to or at a front (e.g., close to a header) of the respective frames. Some hosts may not be able to remove an ICV from the end of a frame. Additionally or alternatively, for other hosts, it may be expensive (in terms of time or power) to remove an ICV from the end of a frame. By adding portion-from-prior fragment 716 close to or at a front of the last frame fragment, the adjusted-frame-fragment timing 704 may ensure that the last frame fragment is not too short without adding data (that is to be removed by the host) to an end of a frame (e.g., without adding a dummy ICV to the end of the last fragment).

FIG. 8A illustrates an example of timing of data blocks (e.g., received at a PHY), the data blocks including data associated with a higher-layer protocol (e.g., MACsec). FIG. 8B illustrates an example of timing of corresponding data blocks (e.g., provided to the MAC) according to one or more examples. In particular, FIG. 8A illustrates ingress frame-fragment timing 802, which is timing of frame fragments received at the PHY. FIG. 8B illustrates adjusted-frame-fragment timing 804, which is a timing of corresponding frame fragments provided to the MAC by the PHY according to one or more examples.

Ingress frame-fragment timing 802 includes data blocks: first fragment, zero or more middle fragment(s), and last fragment. In FIG. 8A, three frame fragments are illustrated for descriptive purposes. In other examples, ingress frame-fragment timing 802 may include any number (zero or greater) of middle frame fragments. Each of the illustrated data blocks of ingress frame-fragment timing 802 may be a fragment of a single pre-emptible frame, e.g., the single pre-emptible frame having been fragmented according to a fragmentations protocol (e.g., which may be included in TSN). Each of the data blocks of ingress frame-fragment timing 802 includes an Ethernet header, a respective payload portion (i.e., front of payload, middle of payload, and end of payload, respectively). Each of the data blocks except the last also includes an mPacket cyclic redundancy check (mCRC). The last data block includes a Frame Check Sequence (FCS). The first fragment of the frame includes SecTag 806 and the last fragment of the frame includes ICV 808. SecTag 806 and ICV 808 may have been added to the frame fragments according to the MACsec protocol implemented at a sender.

Adjusted-frame-fragment timing 804 includes data blocks: first fragment, zero or more middle fragment(s), and last fragment. In FIG. 8B, three frame fragments are illustrated for descriptive purposes. In other examples, adjusted-frame-fragment timing 804 may include any number (zero or greater) of middle frame fragments. Each of the data blocks of adjusted-frame-fragment timing 804 corresponds to a data block of ingress frame-fragment timing 802. In particular, the data blocks of adjusted-frame-fragment timing 804 may be the data blocks of ingress frame-fragment timing 802 after the implementation of MACsec at the receiver. The implementation of MACsec at the receiver may include decrypting at least a portion (e.g., the payload) of one or more data blocks, removing a SecTag from the first data block of the one or more data blocks, and/or removing ICV from the last data block of the one or more data blocks. For example, the first fragment of adjusted-frame-fragment timing 804 may be the first fragment of ingress frame-fragment timing 802 after decryption and removal of SecTag 806.

Similar to what was described with relation to FIG. 7A, a portion may be taken from each frame fragment (except the last) and added to a subsequent frame fragment as a portion-from-prior-fragment e.g., portion-from-prior fragment 810 and portion-from-prior fragment 812. A size of the portion may correspond to a size of ICV 808. As a specific, non-limiting example, ICV 808 may be 16 bytes long and the size of the portion from prior fragment 810 and portion-from-prior fragment 812 may be 16 bytes long.

Adding portion-from-prior fragment 812 to the last frame fragment may ensure that the last frame fragment is not too short. Each of the second through penultimate frame fragments have a portion removed and a portion of equal size added. Thus, the second through penultimate frame fragments may retain their size. To ensure that the first frame fragment is not too short, another device or the network may be configured for fragmentation to ensure that the first fragment is not too short after removal of the SecTag. For example, the sender that fragmented the frames may be instructed not send first fragments below a certain size.

Additionally or alternatively, the portion-from-prior fragment 810 portion-from-prior fragment 812 may be added close to or at a front (e.g., close to a header) of the respective frames. Some hosts may not be able to remove an ICV from the end of a frame. Additionally or alternatively, for other hosts, it may be expensive (in terms of time or power) to remove an ICV from the end of a frame. By adding portion-from-prior fragment 812 close to or at a front of the last frame fragment, the adjusted-frame-fragment timing 804 may ensure that the last frame fragment is not too short without adding data (that is to be removed by the host) to an end of a frame (e.g., without adding a dummy ICV to the end of the last fragment).

Figure 9:
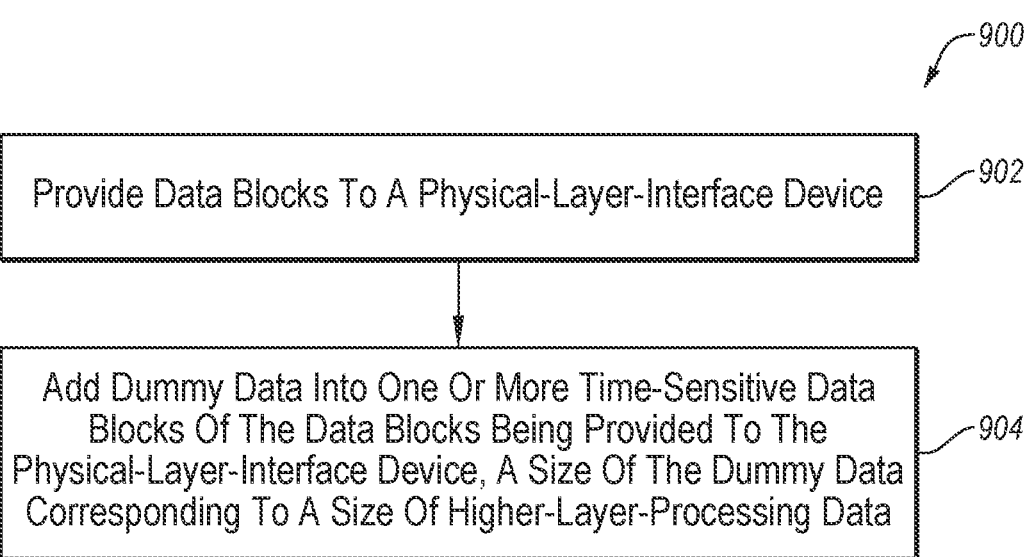
FIG. 9 is a flowchart of an example method according to one or more examples.

FIG. 9 is a flowchart of an example method 900 according to one or more examples. At least a portion of method 900 may be performed, in some examples, by a device or system, such as device 102 or device 108 of FIG. 1, device 202 of FIG. 2, host 204 of FIG. 2, MAC client 208 of FIG. 2, MAC 206 of FIG. 2, circuitry 1300 of FIG. 13, or another device or system. Although illustrated as discrete blocks, various blocks may be divided into additional blocks, combined into fewer blocks, or eliminated, depending on the desired implementation.

At block 902, data blocks may be provided to a physical-layer-interface device (e.g., a PHY). For example, MAC 206 of FIG. 2 may send a data block (e.g., an Ethernet frame for transmission) to PHY 216 of FIG. 2 via MAC-PHY link 232 of FIG. 2.

At block 904, dummy data may be added into one or more time-sensitive data blocks being provided to the physical-layer-interface device. A size of the dummy data may correspond to a size of higher-layer-processing data (e.g., a SecTag and/or an ICV). Adjusted timing 402 of FIG. 4A is an example of data blocks including dummy data, e.g., dummy SecTag 406 of FIG. 4A and dummy ICV 408 of FIG. 4A that may have been added, e.g., at block 904. Adjusted timing 502 is another example of data blocks including dummy data, e.g., dummy SecTag 506 of FIG. 5A that may have been added, e.g., at block 904.

In some examples, the higher-layer-processing data to which the size of the dummy data corresponds may be related to one or more of: Media Access Control security, Internet Protocol security, a cryptographic process, and encapsulation. In some examples, the time sensitivity of the data blocks may be related to Time-Sensitive Networking or another synchronization or real-time protocol. In some examples, the data blocks may be, or may include, one or more of Ethernet frames and/or one or more Ethernet frame fragments.

In some examples, the higher-layer-processing data may be, or may include, a security tag and/or integrity-detection data. The size of the security tag may be a first number of bytes. The size of the integrity-detection data may be a second number of bytes. The size of the dummy data may be a sum of the first number of bytes and the second number of bytes. In some cases, the size of the dummy data may be greater than the sum of the first number of bytes and the second number of bytes.

Figure 10:
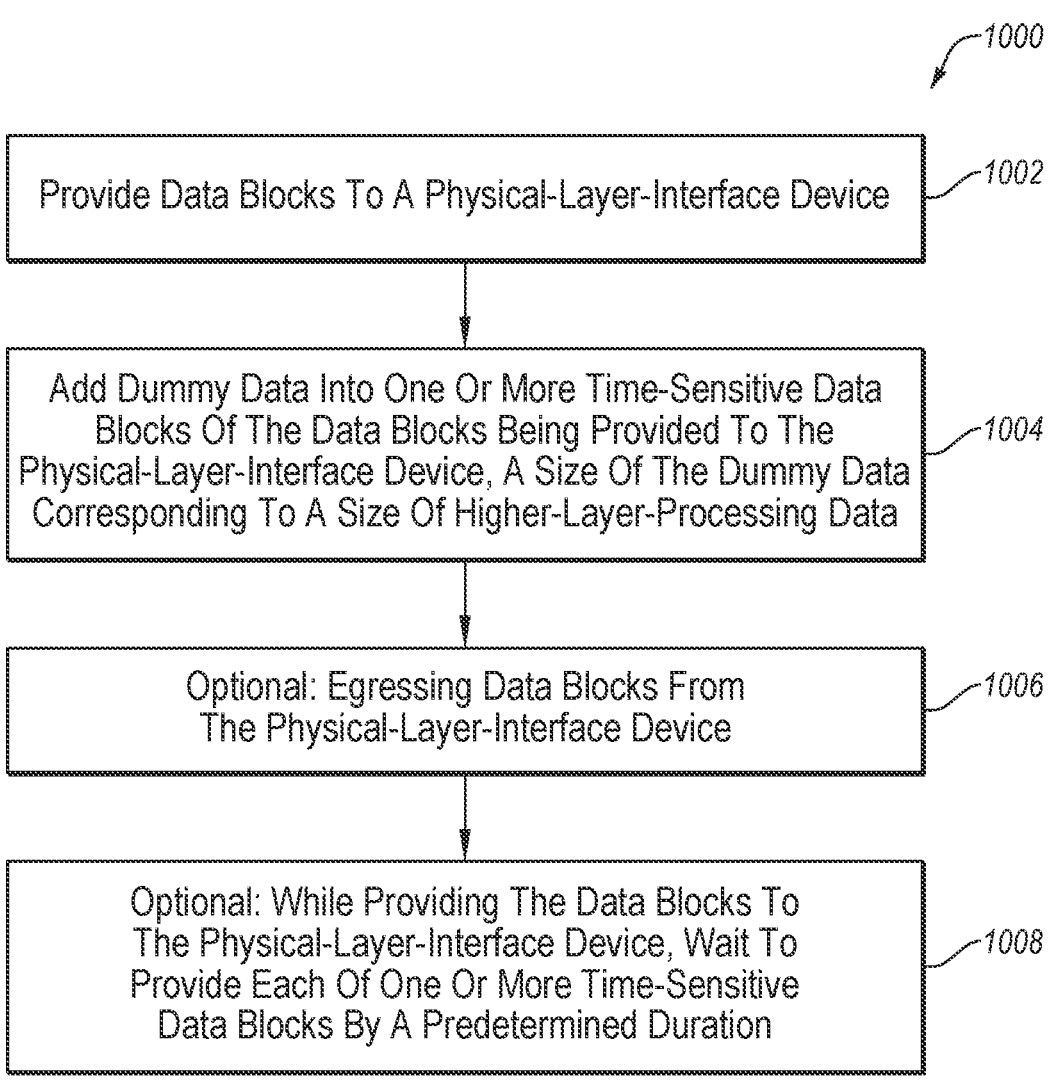
FIG. 10 is a flowchart of another example method according to one or more examples.

FIG. 10 is a flowchart of another example method 1000 according to one or more examples. At least a portion of method 1000 may be performed, in some examples, by a device or system, such as device 102 or device 108 of FIG. 1, device 202 of FIG. 2, host 204 of FIG. 2, MAC client 208 of FIG. 2, MAC 206 of FIG. 2, circuitry 1300 of FIG. 13, or another device or system. Although illustrated as discrete blocks, various blocks may be divided into additional blocks, combined into fewer blocks, or eliminated, depending on the desired implementation.

At block 1002, data blocks may be provided to a physical-layer-interface device (e.g., a PHY). For example, MAC 206 of FIG. 2 may send a data block (e.g., an Ethernet frame for transmission) to PHY 216 of FIG. 2 via a MAC-PHY link 232 of FIG. 2.

At block 1004, dummy data may be added into one or more time-sensitive data blocks being provided to the physical-layer-interface device. A size of the dummy data may correspond to a size of higher-layer-processing data (e.g., a SecTag and/or an ICV). Adjusted timing 502 is an example of data blocks including dummy data, e.g., dummy SecTag 506 of FIG. 5A that may have been added, e.g., at block 1004.

In some examples, the higher-layer-processing data to which the size of dummy data corresponds may be, or may include, a security tag. For example, the size of the higher-layer-processing data may be a first number of bytes. The size of the dummy data may be the first number of bytes.

At block 1006, which is optional, data blocks may be egressed from the physical-layer-interface device, e.g., to the link. For example, the data blocks provide to the physical-layer-interface device, e.g., the data blocks with added dummy data, may be egressed.

At block 1008, which is optional, while providing the data blocks to the physical-layer-interface device, there may be a delay of a predetermined duration in providing each of one or more time-sensitive data blocks. For example, the provider of the data blocks may wait to provide each of one or more time-sensitive data blocks by a predetermined duration. Adjusted timing 502 of FIG. 5A is an example of data frames including a delay (extended IFG 508 of FIG. 5A) of a predetermined duration between providing each of the data blocks.

In some examples, a size of the integrity-detection data may a first number of bytes. The predetermined duration of block 1008 may correspond to a transmission time related to the first number of bytes.

FIG. 11 is a flowchart of yet another example method 1100 according to one or more examples. At least a portion of method 1100 may be performed, in some examples, by a device or system, such as device 102 or device 108 of FIG. 1 device 202 of FIG. 2, PHY 216 of FIG. 2, circuitry 1300 of FIG. 13, or another device or system. Although illustrated as discrete blocks, various blocks may be divided into additional blocks, combined into fewer blocks, or eliminated, depending on the desired implementation.

At block 1102, while receiving data blocks, higher-layer-processing data may be removed from a first ingressing data block. For example, PHY 216 of FIG. 2 may receive data blocks from Ethernet link 234 of FIG. 2. While receiving the data blocks, PHY 216 may remove higher-layer-processing data, i.e., data associated with a higher-layer protocol, from a first ingressing data block. Ingress frame-fragment timing 702 of FIG. 7A is an example of data blocks that may be received at block 1102. Further, adjusted-frame-fragment timing 704 of FIG. 7B is an example of data blocks including a first data block after removal of SecTag 706 of FIG. 7A (an example of higher-layer-processing data), e.g., at block 1102, which may be provided from PHY 216 to MAC 206 of FIG. 2. Similarly, ingress frame-fragment timing 802 of FIG. 8A is an example of data blocks that may be received at block 1102. Further, adjusted-frame-fragment timing 804 of FIG. 8B includes examples of data blocks including a first data block after removal of SecTag 806 of FIG. 8A (an example of higher-layer-processing data), e.g., at block 1102.

In some examples, the higher-layer-processing data removed at block 1102 may be, or may include, data related to one or more of: Media Access Control security, Internet Protocol security, a cryptographic process, and encapsulation. In some examples, the data blocks received in method 1100 may be time sensitive. The time sensitivity of the received data blocks may relate to Time-Sensitive Networking. In some examples, the data blocks received in method 1100 may be, or may include, Ethernet frame fragments. In some examples, the higher-layer-processing data removed at block 1102 may be, or may include, a security tag.

At block 1104, while receiving data blocks, a portion of the first ingressing data block may be removed. Also, at block 1104, the portion may be added to a subsequent ingressing data block. A size of the portion may correspond to the size of integrity-detection data. Adjusted-frame-fragment timing 704 is an example of data blocks wherein a portion of the first data block has been removed and added to a subsequent data block, i.e., portion-from-prior fragment 714 of FIG. 7B. Adjusted-frame-fragment timing 804 is an example of data blocks wherein a portion of the first data block has been removed and added to a subsequent data block, i.e., portion-from-prior fragment 810 of FIG. 8B.

At block 1106, while receiving the data blocks, integrity-detection data from an ingressing data block may be removed. In some examples the size of the integrity-detection data may be a first number of bytes. The size of the portion is the first number of bytes. Adjusted-frame-fragment timing 704 is an example of data blocks wherein integrity-detection data (e.g., ICV 708 of FIG. 7A) has been removed from an ingressing data block (e.g., from a last data block), e.g., at block 1106. Adjusted-frame-fragment timing 804 includes another example of data blocks wherein integrity-detection data (e.g., ICV 808 of FIG. 8A) has been removed from an ingressing data block (e.g., from a last data block), e.g., at block 1106.

In some cases, e.g., cases in which there are only two ingressing data blocks, the subsequent data block may be the last data block. In such cases removing the integrity-detection data from the ingressing data block (at block 1106) may be removing the integrity-detection data from the subsequent ingressing data block.

In other cases, e.g., cases in which there are more than two ingressing data blocks, method 1100 may additionally include removing from each of a number of ingressing data blocks a corresponding portion and adding the corresponding portion to an immediately subsequent ingressing data block of the number of ingressing data blocks or the ingressing data block. And at block 1106, the integrity-detection data may be removed from the last block of the ingressing data blocks.

Figure 12:
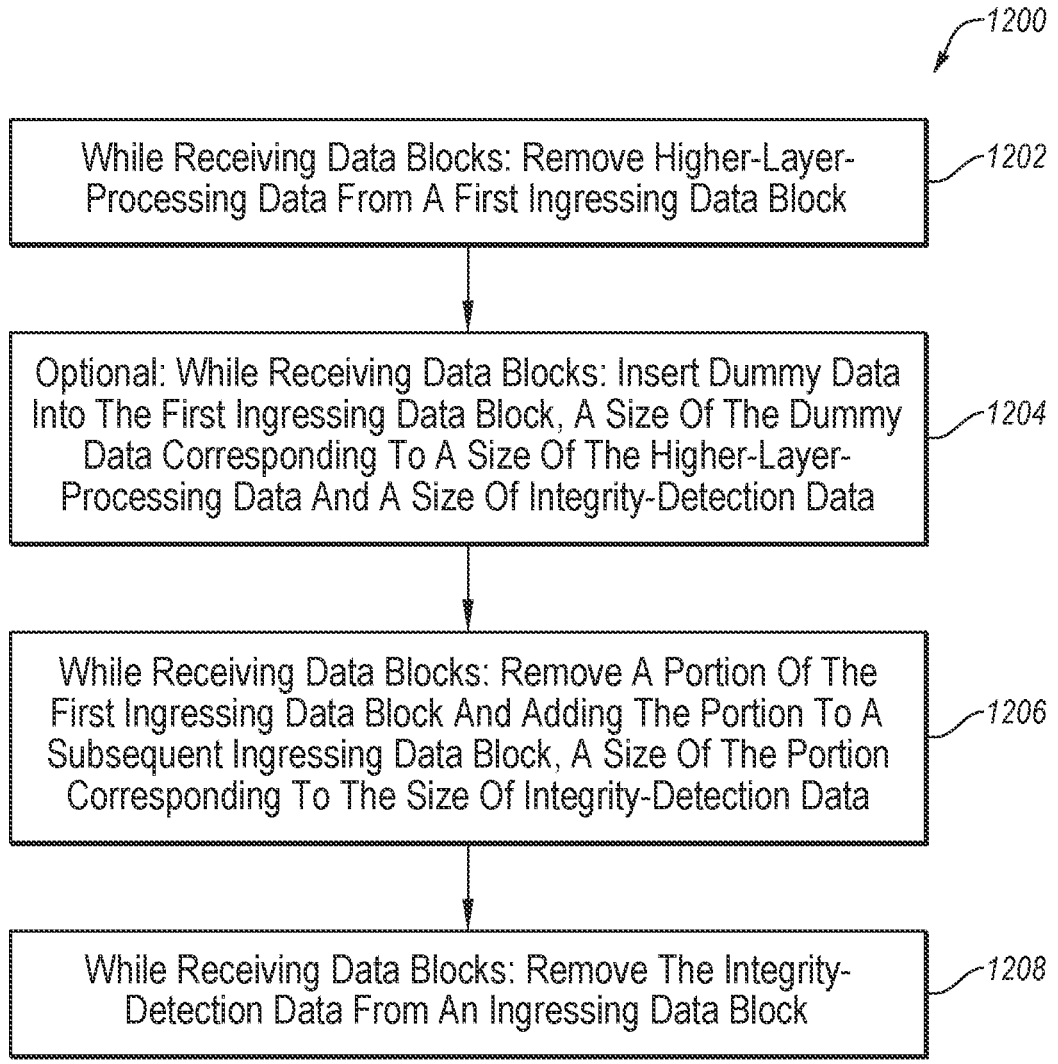
FIG. 12 is a flowchart of yet another example method according to one or more examples.

FIG. 12 is a flowchart of yet another example method 1200 according to one or more examples. At least a portion of method 1200 may be performed, in some examples, by a device or system, such as device 102 or device 108 of FIG. 1, device 202 of FIG. 2, PHY 216 of FIG. 2, circuitry 1300 of FIG. 13, or another device or system. Although illustrated as discrete blocks, various blocks may be divided into additional blocks, combined into fewer blocks, or eliminated, depending on the desired implementation.

At block 1202, while receiving data blocks, higher-layer-processing data may be removed from a first ingressing data block. For example, PHY 216 of FIG. 2 may receive data blocks from Ethernet link 234 of FIG. 2. While receiving the data blocks, PHY 216 may remove higher-layer-processing data from a first ingressing data block. Ingress frame-fragment timing 702 of FIG. 7A is an example of data blocks that may be received at block 1202. Further, adjusted-frame-fragment timing 704 of FIG. 7B is an example of data blocks including a first data block after removal of SecTag 706 of FIG. 7A (an example of higher-layer-processing data), e.g., at block 1202.

At block 1204, which may be optional, while receiving the data blocks, dummy data may be inserted into the first ingressing data block. A size of the dummy data may correspond to a size of the higher-layer-processing data (e.g., a SECtag) and a size of integrity-detection data (e.g., ICV). Adjusted-frame-fragment timing 704 of FIG. 7B is an example of data blocks including a first data block with an inserted dummy data block (e.g., dummy SecTag 710 and dummy ICV 712 of FIG. 7B).

At block 1206, while receiving data blocks, a portion of the first ingressing data block may be removed. Also, at block 1206, the portion may be added to a subsequent ingressing data block. A size of the portion may correspond to the size of integrity-detection data. Adjusted-frame-fragment timing 704 is an example of data blocks wherein a portion of the first data block has been removed and added to a subsequent data block, i.e., portion-from-prior fragment 714 of FIG. 7B.

At block 1208, while receiving data blocks, integrity-detection data from an ingressing data block may be removed. Adjusted-frame-fragment timing 704 is an example of data blocks wherein integrity-detection data (e.g., ICV 708 of FIG. 7A) has been removed from an ingressing data block (e.g., from a last data block), e.g., at block 1208.

In some cases, e.g., cases in which there are only two ingressing data blocks, the subsequent data block may be the last data block. In such cases removing the integrity-detection data from the ingressing data block (at block 1208) may be removing the integrity-detection data from the subsequent ingressing data block.

In other cases, e.g., cases in which there are more than two ingressing data blocks, method 1200 may additionally include removing from each of a number of ingressing data blocks a corresponding portion and adding the corresponding portion to an immediately subsequent ingressing data block of the number of ingressing data blocks or the ingressing data block. And at block 1208, the integrity-detection data may be removed from the last block of the ingressing data blocks.

Figure 13:
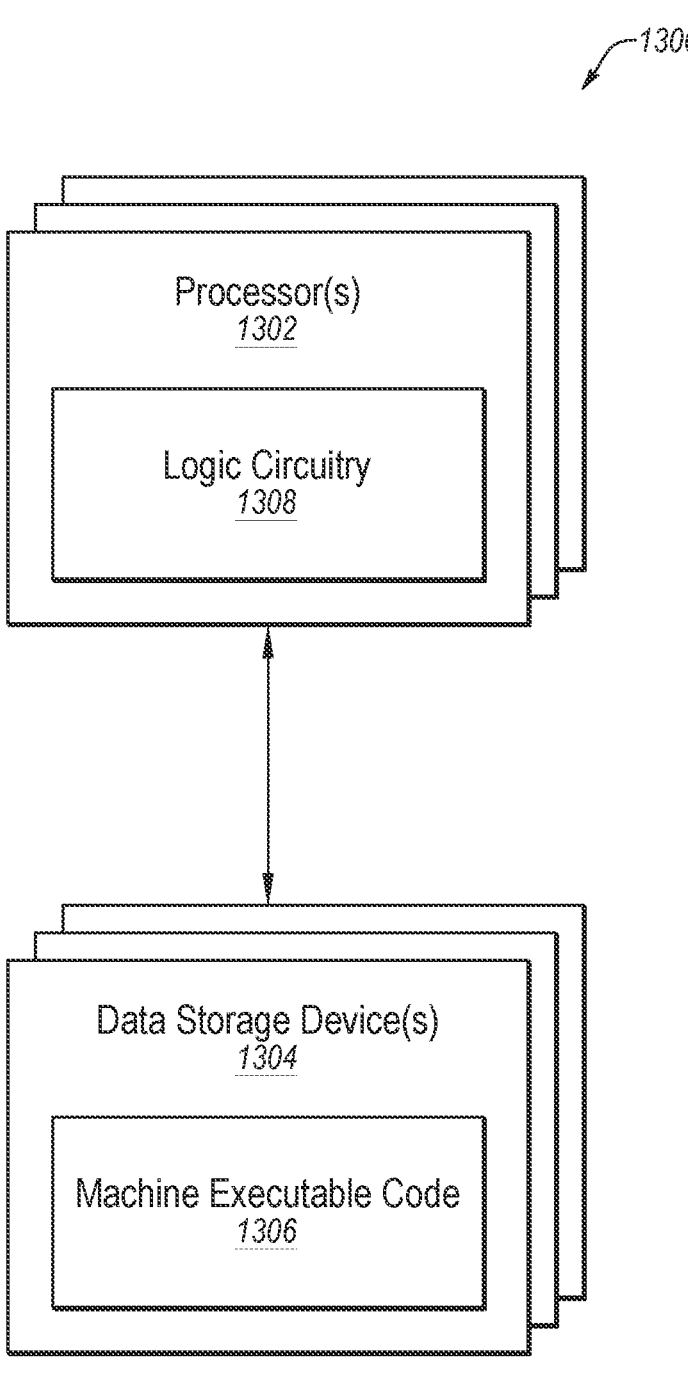
FIG. 13 illustrates a block diagram of circuitry that may be used to implement various functions, operations, acts, processes, and/or methods, in accordance with one or more examples.

FIG. 13 is a block diagram of circuitry 1300 that, in some examples, may be used to implement various functions, operations, acts, processes, and/or methods disclosed herein. The circuitry 1300 includes one or more processors 1302 (sometimes referred to herein as "processors 1302") operably coupled to one or more apparatuses such as data storage devices (sometimes referred to herein as "storage 1304"), without limitation. The storage 1304 includes machine-executable code 1306 stored thereon (e.g., stored on a computer-readable memory) and the processors 1302 include logic circuitry 1308. The machine-executable code 1306 include information describing functional elements that may be implemented by (e.g., performed by) the logic circuitry 1308. The logic circuitry 1308 implements (e.g., performs) the functional elements described by the machine-executable code 1306. The circuitry 1300, when executing the functional elements described by the machine-executable code 1306, should be considered as special purpose hardware for carrying out functional elements disclosed herein. In some examples the processors 1302 may perform the functional elements described by the machine-executable code 1306 sequentially, concurrently (e.g., on one or more different hardware platforms), or in one or more parallel process streams.

When implemented by logic circuitry 1308 of the processors 1302, the machine-executable code 1306 adapts the processors 1302 to perform operations of examples disclosed herein. For example, the machine-executable code 1306 may adapt the processors 1302 to perform at least a portion or a totality of the method 900 of FIG. 9, method 1000 of FIG. 10, method 1100 of FIG. 11, and method 1200, of FIG. 12. As another example, the machine-executable code 1306 may adapt the processors 1302 to perform at least a portion or a totality of the operations discussed for device 102 or device 108 of FIG. 1 and, more specifically, one or more of the MAC 104, PHY 106, MAC 110, and/or PHY 112 of FIG. 1 without limitation. As another example, the machine-executable code 1306 may adapt the processors 1302 to perform at least a portion or a totality of the operations discussed for device 202 of FIG. 2, and more specifically, one or more of the host 204, MAC 206, MAC client 208, TSN scheduling module 210, queue module 212, MAC merge sublayer 214, PHY 216, higher-layer-processing module 218, and/or MACsec module 220, of FIG. 2 without limitation.

The processors 1302 may include a general purpose processor, a special purpose processor, a central processing unit (CPU), a microcontroller, a programmable logic controller (PLC), a digital signal processor (DSP), an application specific integrated circuit (ASIC), a field-programmable gate array (FPGA) or other programmable logic device, discrete gate or transistor logic, discrete hardware components, other programmable device, or any combination thereof designed to perform the functions disclosed herein. A general-purpose computer including a processor is considered a special-purpose computer while the general-purpose computer executes computing instructions (e.g., software code) related to examples of the present disclosure. It is noted that a general-purpose processor (may also be referred to herein as a host processor or simply a host) may be a microprocessor, but in the alternative, the processors 1302 may include any conventional processor, controller, microcontroller, or state machine. The processors 1302 may also be implemented as a combination of computing devices, such as a combination of a DSP and a microprocessor, a plurality of microprocessors, one or more microprocessors in conjunction with a DSP core, or any other such configuration.

In some examples the storage 1304 includes volatile data storage (e.g., random-access memory (RAM)), non-volatile data storage (e.g., Flash memory, a hard disc drive, a solid state drive, erasable programmable read-only memory (EPROM), etc.). In some examples the processors 1302 and the storage 1304 may be implemented into a single device (e.g., a semiconductor device product, a system on chip (SOC), etc.). In some examples the processors 1302 and the storage 1304 may be implemented into separate devices.

In some examples the machine-executable code 1306 may include computer-readable instructions (e.g., software code, firmware code). By way of non-limiting example, the computer-readable instructions may be stored by the storage 1304, accessed directly by the processors 1302, and executed by the processors 1302 using at least the logic circuitry 1308. Also by way of non-limiting example, the computer-readable instructions may be stored on the storage 1304, transmitted to a memory device (not shown) for execution, and executed by the processors 1302 using at least the logic circuitry 1308. Accordingly, in some examples the logic circuitry 1308 includes electrically configurable logic circuitry 1308.

In some examples the machine-executable code 1306 may describe hardware (e.g., circuitry) to be implemented in the logic circuitry 1308 to perform the functional elements. This hardware may be described at any of a variety of levels of abstraction, from low-level transistor layouts to high-level description languages. At a high-level of abstraction, a hardware description language (HDL) such as an Institute of Electrical and Electronics Engineers (IEEE) Standard hardware description language (HDL) may be used, without limitation. By way of non-limiting examples, VERILOG™, SYSTEMVERILOG™ or very large scale integration (VLSI) hardware description language (VHDL™) may be used.

HDL descriptions may be converted into descriptions at any of numerous other levels of abstraction as desired. As a non-limiting example, a high-level description can be converted to a logic-level description such as a register-transfer language (RTL), a gate-level (GL) description, a layout-level description, or a mask-level description. As a non-limiting example, micro-operations to be performed by hardware logic circuits (e.g., gates, flip-flops, registers, without limitation) of the logic circuitry 1308 may be described in a RTL and then converted by a synthesis tool into a GL description, and the GL description may be converted by a placement and routing tool into a layout-level description that corresponds to a physical layout of an integrated circuit of a programmable logic device, discrete gate or transistor logic, discrete hardware components, or combinations thereof. Accordingly, in some examples the machine-executable code 1306 may include an HDL, an RTL, a GL description, a mask level description, other hardware description, or any combination thereof.

In examples where the machine-executable code 1306 includes a hardware description (at any level of abstraction), a system (not shown, but including the storage 1304) may implement the hardware description described by the machine-executable code 1306. By way of non-limiting example, the processors 1302 may include a programmable logic device (e.g., an FPGA or a PLC) and the logic circuitry 1308 may be electrically controlled to implement circuitry corresponding to the hardware description into the logic circuitry 1308. Also by way of non-limiting example, the logic circuitry 1308 may include hard-wired logic manufactured by a manufacturing system (not shown, but including the storage 1304) according to the hardware description of the machine-executable code 1306.

Regardless of whether the machine-executable code 1306 includes computer-readable instructions or a hardware description, the logic circuitry 1308 performs the functional elements described by the machine-executable code 1306 when implementing the functional elements of the machine-executable code 1306. It is noted that although a hardware description may not directly describe functional elements, a hardware description indirectly describes functional elements that the hardware elements described by the hardware description are capable of performing.

As used in the present disclosure, the terms "module" or "component" may refer to specific hardware implementations that perform the actions of the module or component and/or software objects or software routines that may be stored on and/or executed by general purpose hardware (e.g., computer-readable media, processing devices, etc.) of the computing system. In some examples, the different components, modules, engines, and services described in the present disclosure may be implemented as objects or processes that execute on the computing system (e.g., as separate threads). While some of the system and methods described in the present disclosure are generally described as being implemented in software (stored on and/or executed by general purpose hardware), specific hardware implementations or a combination of software and specific hardware implementations are also possible and contemplated.

As used in the present disclosure, the term "combination" with reference to a plurality of elements may include a combination of all the elements or any of various different sub-combinations of some of the elements. For example, the phrase "A, B, C, D, or combinations thereof" may refer to any one of A, B, C, or D; the combination of each of A, B, C, and D; and any sub-combination of A, B, C, or D such as A, B, and C; A, B, and D; A, C, and D; B, C, and D; A and B; A and C; A and D; B and C; B and D; or C and D.

Terms used in the present disclosure and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to examples containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, those skilled in the art will recognize that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additional non-limiting examples of the disclosure may include:

Example 1: An apparatus comprising: a circuit to provide data blocks to a physical-layer interface device that includes logic to perform higher-layer processing on received data blocks; and a logic circuit to: add dummy data into one or more time-sensitive data blocks of the data blocks, a size of the dummy data corresponding to a size of higher-layer-processing data; and provide the data blocks, including the one or more time-sensitive data blocks, to the physical-layer interface device.

Example 2: The apparatus according to Example 1, wherein the higher-layer-processing data is related to one or more of: Media Access Control security, Internet Protocol security, a cryptographic process, and encapsulation.

Example 3: The apparatus according to any of Examples 1 and 2, wherein time sensitivity of the data blocks is related to Time-Sensitive Networking.

Example 4: The apparatus according to any of Examples 1 through 3, wherein the data blocks comprise one or more of Ethernet frames and Ethernet frame fragments.

Example 5: The apparatus according to any of Examples 1 through 4, wherein: the higher-layer-processing data comprises a security tag and integrity-detection data; the size of the security tag is a first number of bytes; the size of the integrity-detection data is a second number of bytes; and the size of the dummy data is a sum of the first number of bytes and the second number of bytes.

Example 6: The apparatus according to any of Examples 1 through 5, comprising: the physical-layer-interface device including the logic to perform higher-layer processing on the received data blocks.

Example 7: A method comprising: providing data blocks to a physical-layer-interface device that includes logic to perform higher-layer processing on received data blocks; and adding dummy data into one or more time-sensitive data blocks of the data blocks being provided to the physical-layer-interface device, a size of the dummy data corresponding to a size of higher-layer-processing data.

Example 8: The method according to Example 7, comprising egressing the data blocks at the physical-layer-interface device.

Example 9: The method according to any of Examples 7 and 8, comprising while providing the data blocks to the physical-layer-interface device, waiting to provide each of one or more time-sensitive data blocks by a predetermined duration.

Example 10: The method according to any of Examples 7 through 9, wherein: the higher-layer-processing data comprises a security tag; the size of the higher-layer-processing data is a first number of bytes; and the size of the dummy data is the first number of bytes.

Example 11: The method according to any of Examples 7 through 10, wherein: a size of integrity-detection data is a first number of bytes; and the predetermined duration corresponds to a transmission time related to the first number of bytes.

Example 12: An apparatus, comprising: a physical-layer interface device to: receive data blocks; remove higher-layer-processing data from a first ingressing data block; remove a portion of the first ingressing data block and adding the portion to a subsequent ingressing data block, a size of the portion corresponding to a size of integrity-detection data; and remove the integrity-detection data from an ingressing data block.

Example 13: The apparatus according to Example 12, wherein the higher-layer-processing data comprises data related to one or more of: Media Access Control security, Internet Protocol security, a cryptographic process, and encapsulation.

Example 14: The apparatus according to any of Examples 12 and 13, wherein the received data blocks are time sensitive, time sensitivity of the received data blocks related to Time-Sensitive Networking.

Example 15: The apparatus according to any of Examples 12 through 14, wherein the data blocks comprise Ethernet frame fragments.

Example 16: The apparatus according to any of Examples 12 through 15, wherein the higher-layer-processing data comprises a security tag.

Example 17: The apparatus according to any of Examples 12 through 16, wherein: the size of the integrity-detection data is a first number of bytes; and the size of the portion is the first number of bytes.

Example 18: A method, comprising: receiving data blocks; removing higher-layer-processing data from a first ingressing data block; removing a portion of the first ingressing data block and adding the portion to a subsequent ingressing data block, a size of the portion corresponding to a size of integrity-detection data; and removing the integrity-detection data from an ingressing data block.

Example 19: The method according to Example 18, wherein removing the integrity-detection data from the ingressing data block comprises removing the integrity-detection data from the subsequent ingressing data block.

Example 20: The method according to any of Examples 18 and 19, comprising: removing from each of a number of ingressing data blocks a corresponding portion and adding a respective corresponding portion to an immediately-subsequent ingressing data block of the number of ingressing data blocks, a size of the corresponding portions corresponding to the size of the integrity-detection data.

Example 21: The method according to any of Examples 18 through 20, comprising while receiving the data blocks, inserting dummy data into the first ingressing data block, a size of the dummy data corresponding to a sum of a size of the higher-layer-processing data and a size of the integrity-detection data.

While the present disclosure has been described herein with respect to certain illustrated examples, those of ordinary skill in the art will recognize and appreciate that the present invention is not so limited. Rather, many additions, deletions, and modifications to the illustrated and described examples may be made without departing from the scope of the invention as hereinafter claimed along with their legal equivalents. In addition, features from one example may be combined with features of another example while still being encompassed within the scope of the invention as contemplated by the inventor.

What is claimed is:

1. An apparatus comprising:
a circuit configured to provide data blocks to a physical-layer interface device, wherein the physical layer device includes logic configured to perform higher-layer processing on received data blocks, wherein the higher-layer processing includes operations associated with Open Systems Interconnection (OSI) layer 2 or higher and comprises adding higher-layer-processing data to the data blocks; and
a logic circuit configured to:
add dummy data into one or more time-sensitive data blocks of the data blocks, a size of the dummy data corresponding to a size of higher-layer-processing data such that the addition of the higher-layer-processing data at the physical-layer interface device does not disrupt timing of the one or more time-sensitive data blocks according to a time-sensitive networking (TSN) protocol; and
provide the data blocks, including the one or more time-sensitive data blocks, to the physical-layer interface device.

2. The apparatus of claim 1, wherein the higher-layer-processing data is related to one or more of: Media Access Control security, Internet Protocol security, a cryptographic process, and encapsulation.

3. The apparatus of claim 1, wherein time sensitivity of the data blocks is related to Time-Sensitive Networking.

4. The apparatus of claim 1, wherein the data blocks comprise one or more of Ethernet frames and Ethernet frame fragments.

5. The apparatus of claim 1, wherein:

the higher-layer-processing data comprises a security tag and integrity-detection data; the size of the security tag is a first number of bytes;

the size of the integrity-detection data is a second number of bytes; and the size of the dummy data is a sum of the first number of bytes and the second number of bytes.

6. The apparatus of claim 1, comprising: the physical-layer-interface device including the logic configured to perform higher-layer processing on the received data blocks.

7. A method comprising:

providing data blocks to a physical-layer-interface device, wherein the physical-layer interface includes logic configured to perform higher-layer processing on received data blocks, wherein the higher-layer processing includes operations associated with Open Systems Interconnection (OSI) layer 2 or higher and comprises adding higher-layer-processing data to the data blocks; and adding dummy data into one or more time-sensitive data blocks of the data blocks being provided to the physical-layer-interface device, a size of the dummy data corresponding to a size of higher-layer-processing data such that the addition of the higher-layer-processing data at the physical-layer-interface device does not disrupt timing of the one or more time-sensitive data blocks according to a time-sensitive networking (TSN) protocol.

8. The method of claim 7, comprising egressing the data blocks at the physical-layer-interface device.

9. The method of claim 7, comprising while providing the data blocks to the physical-layer-interface device, waiting to provide each of one or more time-sensitive data blocks by a predetermined duration.

10. The method of claim 9, wherein:

the higher-layer-processing data comprises a security tag;

the size of the higher-layer-processing data is a first number of bytes; and the size of the dummy data is the first number of bytes.

11. The method of claim 9, wherein:

a size of integrity-detection data is a first number of bytes; and the predetermined duration corresponds to a transmission time related to the first number of bytes.

12. An apparatus, comprising: a physical-layer interface device, the physical-layer interface device configured to:

receive data blocks;

remove higher-layer-processing data from a first ingressing data block of the received data blocks, wherein the higher-layer processing of the higher-layer processing data includes operations associated with Open Systems Interconnection (OSI) layer 2 or higher and comprises removing higher-layer-processing data from the data blocks, wherein the higher-layer processing data removed from the first ingressing data block includes integrity-detection data;

remove a portion of the first ingressing data block; and add the portion of the first ingressing data block to a subsequent ingressing data block, a size of the portion corresponding to a size of integrity-detection data such that the removal of the higher-layer-processing data at the physical-layer interface device does not render the ingressing data blocks too short according to a time-sensitive networking (TSN) protocol.

13. The apparatus of claim 12, wherein the higher-layer-processing data comprises data related to one or more of: Media Access Control security, Internet Protocol security, a cryptographic process, and encapsulation.

14. The apparatus of claim 12, wherein the received data blocks are time sensitive, time sensitivity of the received data blocks related to Time-Sensitive Networking.

15. The apparatus of claim 12, wherein the data blocks comprise Ethernet frame fragments.

16. The apparatus of claim 12, wherein the higher-layer-processing data comprises a security tag.

17. The apparatus of claim 12, wherein:

the size of the integrity-detection data is a first number of bytes; and the size of the portion is the first number of bytes.

18. A method, comprising:

receiving data blocks;

removing higher-layer-processing data from a first ingressing data block of the received data blocks, wherein the higher-layer processing of the higher-layer processing data includes operations associated with Open Systems Interconnection (OSI) layer 2 or higher and comprises removing higher-layer-processing data from the data blocks, wherein removing the higher-layer processing data from the first ingressing data block includes removing integrity-detection data from the first ingressing data block; and removing a portion of the first ingressing data block; and adding the portion to a subsequent ingressing data block, a size of the portion corresponding to a size of integrity-detection data such that the removal of the higher-layer-processing data at a physical-layer interface device does not render the ingressing data blocks too short according to a time-sensitive networking (TSN) protocol.

19. The method of claim 18, wherein removing the integrity-detection data from the ingressing data block comprises removing the integrity-detection data from the subsequent ingressing data block.

20. The method of claim 18, comprising: removing from each of a number of ingressing data blocks a corresponding portion and adding a respective corresponding portion to an immediately-subsequent ingressing data block of the number of ingressing data blocks, a size of the corresponding portions corresponding to the size of the integrity-detection data.

21. The method of claim 18, comprising while receiving the data blocks, inserting dummy data into the first ingressing data block, a size of the dummy data corresponding to a sum of a size of the higher-layer-processing data and a size of the integrity-detection data.

22. The apparatus of claim 1, wherein the higher-layer processing includes operations associated with Open Systems Interconnection (OSI) layer 2 or higher.

23. The method of claim 7, wherein the higher-layer processing includes operations associated with Open Systems Interconnection (OSI) layer 2 or higher.

* * * * *